United States Patent
Zhang et al.

(10) Patent No.: US 11,381,338 B2
(45) Date of Patent: Jul. 5, 2022

(54) DATA TRANSMISSION METHOD, COMMUNICATIONS DEVICE, AND STORAGE MEDIUM

(71) Applicant: HUAWEI TECHNOLOGIES CO., LTD., Shenzhen (CN)

(72) Inventors: Xiaojun Zhang, Shenzhen (CN); Lehong Niu, Shenzhen (CN); Qiwen Zhong, Shenzhen (CN); Zhigang Zhu, Shenzhen (CN); Qichang Chen, Shenzhen (CN); Rixin Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 16/909,424

(22) Filed: Jun. 23, 2020

(65) Prior Publication Data

US 2020/0322084 A1 Oct. 8, 2020

Related U.S. Application Data

(63) Continuation of application No. PCT/CN2018/119417, filed on Dec. 5, 2018.

(30) Foreign Application Priority Data

Dec. 29, 2017 (CN) .......................... 201711489338.8

(51) Int. Cl.
*H04L 1/00* (2006.01)
*H04J 3/06* (2006.01)
(Continued)

(52) U.S. Cl.
CPC .......... *H04L 1/0014* (2013.01); *H04J 3/0635* (2013.01); *H04L 1/0057* (2013.01); *H04L 69/22* (2013.01); *H04Q 11/0005* (2013.01)

(58) Field of Classification Search
CPC ..... H04L 1/0014; H04L 1/0057; H04L 69/22; H04J 3/0635; H04Q 11/0005
(Continued)

(56) References Cited

U.S. PATENT DOCUMENTS

2007/0234172 A1* 10/2007 Chiabrera ............. H04L 1/0043
714/752
2007/0263533 A1 11/2007 Chiabrera
(Continued)

FOREIGN PATENT DOCUMENTS

| CN | 101005338 A | 7/2007 |
| CN | 101034935 A | 9/2007 |

(Continued)

OTHER PUBLICATIONS

Huawei:"Ultra-Low Latency Ethernet", Ethernet Everywhere, Dec. 2016. retrieved from the internet:"https://www.itu.int/en/ITU-T/Workshops-and-Seminars/201612/Documents/slides/14-Huawei-X-Ethernet.pdf". Total 11 pages.
(Continued)

*Primary Examiner* — Obaidul Huq
(74) *Attorney, Agent, or Firm* — Stein IP, LLC

(57) ABSTRACT

A data transmission method includes: obtaining Q first code block streams, wherein Q is an integer greater than 1, the coding type is M1/N1 bit coding, and one code block in the first code block stream comprises a synchronization header area of (N1−M1) bits and a non-synchronization one code block in the second code block stream comprises a synchronization header area of (N1−M1) bits and a non-synchronization header area of M1 bits, and a non-synchronization header area of a code block in the Q first code block streams is carried in a non-synchronization header area of a code block in the second code block stream. header area of M1 bits; and placing non-synchronization header areas of code
(Continued)

blocks in the Q first code block streams into a to-be-sent second code block stream, wherein a coding type of the second code block stream is M1/N1 bit coding.

20 Claims, 15 Drawing Sheets

(51) Int. Cl.
  *H04L 69/22* (2022.01)
  *H04Q 11/00* (2006.01)
(58) Field of Classification Search
  USPC .................................................. 370/241, 252
  See application file for complete search history.

(56) References Cited

U.S. PATENT DOCUMENTS

| | | | |
|---|---|---|---|
| 2010/0223535 A1* | 9/2010 | Geng | H04L 1/0057 714/784 |
| 2016/0070615 A1* | 3/2016 | Zhong | G06F 11/10 714/776 |
| 2017/0005742 A1 | 1/2017 | Gareau et al. | |

FOREIGN PATENT DOCUMENTS

| | | |
|---|---|---|
| CN | 101179556 A | 5/2008 |
| CN | 101237440 A | 8/2008 |
| CN | 102439995 A | 5/2012 |
| CN | 103534971 A | 1/2014 |
| CN | 103797742 A | 5/2014 |
| CN | 107438028 A | 12/2017 |
| EP | 2999152 A1 | 3/2016 |
| EP | 3113502 A1 | 1/2017 |
| JP | 2002271287 A | 9/2002 |
| JP | 2004120503 A | 4/2004 |
| JP | 2008085970 A | 4/2008 |

OTHER PUBLICATIONS

IEEE Std 802.3—2015, IEEE Standard for Ethernet, IEEE Computer Society, Sponsored by the LAN/MAN Standards Committee, Approved Sep. 3, 2015, 4017 pages.

IA OIF-FLEXE-01.0, Flex Ethernet Implementation Agreement, Mar. 2016, 31 pages.

* cited by examiner

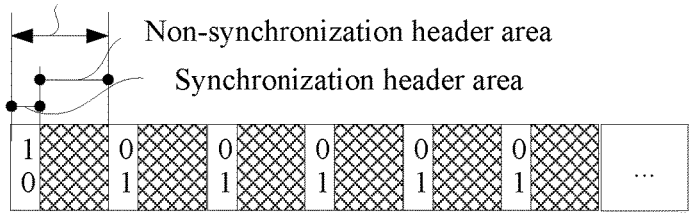
Code block 6204 in a first code block stream 6201
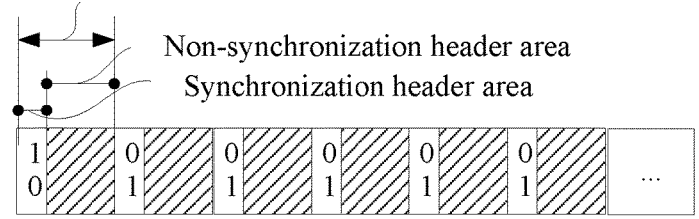
Code block 6205 in a first code block stream 6202
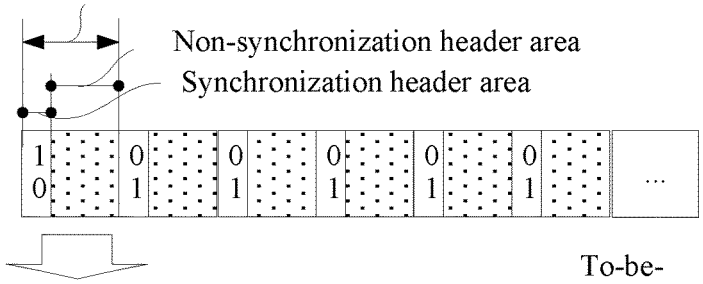
Code block 6206 in a first code block stream 6203
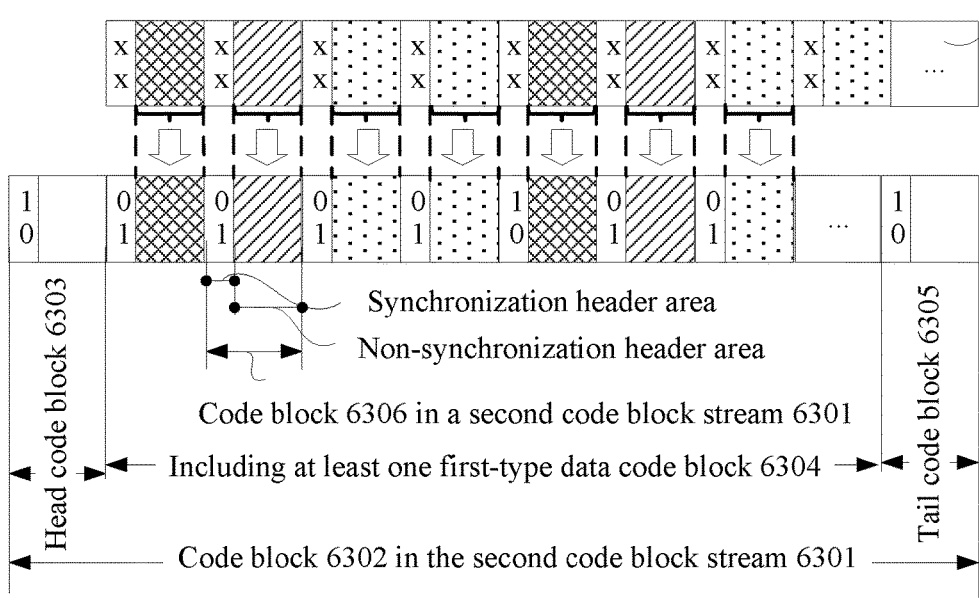
FIG. 15

Receive a second code block stream, where a non-synchronization header area of a code block in Q first code block streams is carried in a non-synchronization header area of a code block in the second code block stream, Q is an integer greater than 1, a coding type of the second code block stream is M1/N1 bit coding, a coding type of the first code block stream is M1/N1 bit coding, M1 is a positive integer, N1 is an integer not less than M1, one code block in the first code block stream includes a synchronization header area of (N1–M1) bits and a non-synchronization header area of M1 bits, and one code block in the second code block stream includes a synchronization header area of (N1–M1) bits and a non-synchronization header area of M1 bits  — 7201

Demultiplex the Q first code block streams — 7202

FIG. 18

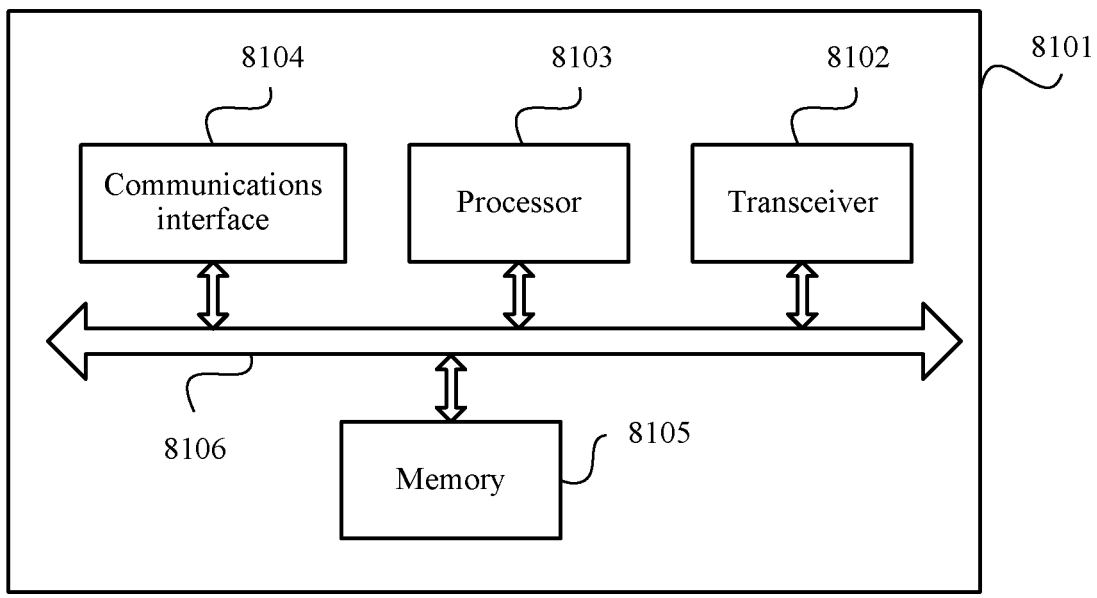

FIG. 19

DATA TRANSMISSION METHOD, COMMUNICATIONS DEVICE, AND STORAGE MEDIUM

CROSS-REFERENCE TO RELATED APPLICATIONS

This application is a continuation of International Application No. PCT/CN2018/119417, filed on Dec. 5, 2018, which claims priority to Chinese Patent Application No. 201711489338.8, filed on Dec. 29, 2017, The disclosures of the aforementioned applications are hereby incorporated by reference in their entireties.

TECHNICAL FIELD

Aspects of this application relate to the communications field, and in particular, to a data transmission method, a communications device, and a storage medium.

BACKGROUND

The Optical Internet Forum (OIF) has released a flexible Ethernet (FlexE), and the FlexE is a general technology that supports a plurality of Ethernet MAC layer rates. A plurality of 100 GE (Physical, PHYs) ports are bound, and each 100 GE port is divided into 20 slots by using 5 G as a granularity in time domain, so that the FlexE may support the following functions: binding, where a plurality of Ethernet ports are bound into one link group to support a medium access control (MAC) service whose rate is greater than that of a single Ethernet port; a sub-rate that supports, by allocating a slot to a service, a MAC service whose rate is less than a link group bandwidth or is less than a signal Ethernet port bandwidth; and channelization that supports simultaneous transmission of a plurality of MAC services in a link group by allocating a slot to a service, for example, supports simultaneous transmission of one 150 G MAC service and two 25 G MAC services in a 2×100 GE link group.

In the FlexE, slots are divided in a time division multiplexing (TDM) manner, to implement hard isolation of transmission channel bandwidths, and one service data stream may be allocated to one to more slots, to match various rate services. One FlexE group (which may also be referred to as a FlexE Group) may include one or more physical link interfaces (which may also be written as PHY). FIG. 1 is an example schematic diagram of a communications system based on a flexible Ethernet protocol. As shown in FIG. 1, for example, a FlexE group includes four PHYs. A flexible Ethernet protocol client (FlexE Client) represents a client data stream transmitted in a specified slot (one or more slots) in the FlexE group. One FlexE group may carry a plurality of FlexE clients. One FlexE client corresponds to one user service data stream (which may be typically referred to as a medium access control (Medium Access Control, MAC) client). A flexible Ethernet protocol function layer (which may be referred to as a FlexE shim in English) provides data adaptation and conversion from the FlexE client to the MAC client.

Huawei Technologies released a new technology at the ITU-T IMT 2020 workshop in December 2016. This technology architecture may be referred to as a ubiquitous Ethernet (which may be referred to as an X-Ethernet or X-E), and is a new-generation switch networking technology that is based on an Ethernet physical layer and is characterized by a deterministic ultra-low delay. One of concepts of the ubiquitous Ethernet is switch networking based on a bit block sequence, such as an unscrambled 64B/66B code block sequence or an equivalent 8B/10B code block sequence, or a 9-bit block sequence including a 1-bit out-of-band control indication on an Ethernet medium-unrelated interface xMII (such as GMII, XGMII, or 25 GMII) and an 8-bit character, but lacks consideration of hierarchical multiplexing, and is not suitable for large-scale networking application. FIG. 2 is an example schematic diagram of an X-E communications system architecture. As shown in FIG. 2, the communications system may include two types of communications devices, for example, a first communications device 1011 and a second communications device 1012. The first communications device 1011 may also be described as a communications device on an edge of a carrier network (referred to as a network below), and may be referred to as a provider edge node, or as a PE node for short. The second communications device 1012 may also be described as a communications device inside the carrier network (referred to as a network below), and may be referred to as a provider node, or as a P node for short.

One side of the first communications device 1011 may be connected to user equipment, or may be connected to a client network device. Comparatively, an interface connected to the user equipment or the client network device may be referred to as a user-side network interface 1111 (User network interface, UNI), or may be described as an interface used by the network to connect to a user. The other side of the first communications device 1011 is connected to the second communications device 1012. As shown in FIG. 2, the other side of the first communications device 1011 is connected to the second communications device 1012 by using a network to network interface 1112 (NNI). The network to network interface 1112 may also be described as an interface between networks or between communications devices in the network. Optionally, the second communications device 1012 may be connected to another communications device (for example, may be another second communications device or first communications device). Only one second communications device is schematically shown in the figure. A person skilled in the art may learn that one or more connected communications devices may be included between two first communications devices.

As shown in FIG. 2, an adapter may be configured on an interface side of a communications device, for example, a UNI-side adapter (which may be referred to as a U-adaptor) 1113 configured on a UNI 1111 side, and an adapter (which may be referred to as an N-adaptor) 1114 configured on an NNI 1112 side. When a network device performs end-to-end networking based on an X-E interface, an X-E switching module 1115 (which may be referred to as an X-E switch) may be configured in the first communications device and the second communications device. FIG. 2 is an example schematic diagram of an end-to-end path 1116.

The X-E currently performs end-to-end networking based on a FlexE interface, and this belongs to a flat and non-hierarchical networking switching. An OIF FlexE defines slot (SLOT) granularities of rates of 5 Gbps and 25 Gbps based on a 64B/66B code block (referred to as 64B/66B below). Any FlexE client may be carried in several slots allocated with a total bandwidth rate of Q*5 Gbps or Q*25 Gbps (a value range of Q is an integer greater than or equal to 1) on an NNI or a UNI based on the FlexE. The P node in the X-E network needs to parse and extract each FlexE client and perform switching processing, without consideration of hierarchical multiplexing. FIG. 3 is an example schematic diagram of communication in which an X-Ethernet flat networking technology is applied to end-to-end networking of a metropolitan area network and a backbone network. Tens of thousands of dedicated-line services need to be scheduled between a plurality of cities, and convergence nodes (convergence shown in FIG. 3) and backbone nodes (backbone shown in FIG. 3) need to manage hundreds of thousands of end-to-end cross connections. There are difficulties in management, operation, and maintenance. Each core node (for example, the convergence node and the backbone node) has difficulties and pressure in processing a large quantity of cross connections on a data plane.

SUMMARY

In this application, "a plurality of" refers to two or more than two. The term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects.

Aspects of this application provide a data transmission method, a communications device, and a storage medium, to reduce pressure on intermediate nodes in a network caused by a quantity of cross connections between the intermediate nodes, and also reduce pressure on network management, operation, and maintenance.

According to a first aspect, an embodiment of this application provides a data transmission method. In the method, Q first code block streams are obtained, where Q is an integer greater than 1, a coding type of the first code block stream is M1/N1 bit coding, M1 is a positive integer, N1 is an integer not less than M1, and one code block in the first code block stream includes a synchronization header area of (N1−M1) bits and a non-synchronization header area of M1 bits; and non-synchronization header areas of code blocks in the Q first code block streams are placed into a to-be-sent second code block stream, where a coding type of the second code block stream is M1/N1 bit coding, one code block in the second code block stream includes a synchronization header area of (N1−M1) bits and a non-synchronization header area of M1 bits, and a non-synchronization header area of a code block in the Q first code block streams is carried in a non-synchronization header area of a code block in the second code block stream. In this way, in the solution provided in this embodiment of this application, a code block stream is multiplexed and demultiplexed at a code block granularity, the second code block stream arrives at a communications device on a demultiplexing side through at least one intermediate node, and the intermediate node does not demultiplex the second code block stream, so that a quantity of cross connections between intermediate nodes in a network can be reduced, thereby reducing pressure on network management, operation, and maintenance.

In an optional implementation, the second code block stream may include at least one data unit. One data unit in the at least one data unit may also include a head code block and at least one data code block; or one data unit in the at least one data unit may include a head code block, at least one data code block, and a tail code block; or one data unit in the at least one data unit includes at least one data code block and a tail code block. In this way, a boundary of the data unit may be determined by using the head code block and/or the tail code block, so that the communications device identifies a boundary of each data unit in the second code block stream, thereby laying a foundation for demultiplexing the Q first code block streams.

In an optional implementation, the at least one data code block may include at least one first-type data code block, or the at least one data code block may include at least one first-type data code block and at least one second-type data code block. A non-synchronization header area of a code block in the Q first code block streams may be carried in a non-synchronization header area of a first-type data code block in the second code block stream; and/or type indication information corresponding to a code block in the Q first code block streams may be carried in a non-synchronization header area of any one of the head code block, the second-type data code block, and the tail code block in the second code block stream. Type indication information corresponding to a code block may be used to indicate information carried in a synchronization header area of the code block. In this way, both information corresponding to a non-synchronization header area and information corresponding to a synchronization header area of a code block in the first code block stream may be correspondingly carried in the second code block stream, and a quantity of code blocks in a first code block stream multiplexed by a data unit in the second code block stream can be improved by increasing bits of an area of type indication information in the data unit, thereby improving transmission efficiency.

In an optional implementation, to be compatible with the prior art, the head code block is an S code block, and/or the tail code block is a T code block.

In an optional implementation, for a code block in the Q first code block streams that is carried in the second code block stream, the second code block stream further includes identifier indication information corresponding to the code block, where the identifier indication information may be used to indicate an identifier of a first code block stream corresponding to the code block. In this way, an identifier of a first code block stream corresponding to a non-synchronization header area of a code block that is extracted from the first code block stream and carried in the second code block stream can be indicated to the communications device on the demultiplexing side, thereby laying a foundation for demultiplexing the Q first code block streams by the communications device on the demultiplexing side.

In an optional implementation, the placing of non-synchronization header areas of code blocks in the Q first code block streams into a to-be-sent second code block stream may include: extracting the code blocks from the Q first code block streams based on an order of the Q first code block streams, to obtain a to-be-processed code block sequence, where for a first code block stream in the Q first code block streams, a quantity of code blocks consecutively extracted from the first code block stream may be determined based on a bandwidth and a threshold of the first code block stream; and placing non-synchronization header areas of the code blocks in the to-be-processed code block sequence into the to-be-sent second code block stream. In this way, a quantity of code blocks consecutively extracted from each first code block stream can be determined based on a bandwidth of the first code block stream, so that a transmission rate obtained after each first code block stream is multiplexed is relatively close to a transmission rate obtained before the first code block stream is multiplexed.

In an optional implementation, for a code block in the Q first code block streams that is carried in the second code block stream, the second code block stream may further include type indication information corresponding to the code block, where the type indication information may be used to indicate information that may be used to indicate a code block type of the code block and that may be carried in a synchronization header area of the code block. In this way, a quantity of bits occupied by the type indication information can be compressed, so that the quantity of bits occupied by the type indication information is less than a quantity of bits carried in the synchronization header area, thereby transmitting information carried in the synchronization header area of the code block in the first code block stream, and also reducing an amount of data transmitted on the second code block stream.

In an optional implementation, an order of the code blocks that are included in the to-be-processed code block sequence and extracted from the Q first code block streams may match an order of type indication information carried in the second code block stream. In this way, the demultiplexing side can determine, based on a relationship between the order of the code blocks and the order of the type indication information, type indication information corresponding to the code blocks that are included in the to-be-processed code block sequence and extracted from the Q first code block streams, and then restore information corresponding to the synchronization header area corresponding to the non-synchronization header area carried in the second code block stream.

In an optional implementation, after the extracting the code blocks from the Q first code block streams to obtain a to-be-processed code block sequence, the method may further include: if L consecutive code blocks in the to-be-processed code block sequence are IDLE code blocks, deleting the L code blocks, where L is a total quantity of code blocks obtained after a code block is extracted from each of the Q first code block streams, and L is an integer not less than Q. In this way, data transmission efficiency can be improved.

In an optional implementation, the threshold may be determined based on a common divisor or a maximum common divisor of Q bandwidths corresponding to the Q first code block streams. Because there is a multiple relationship between many service rates, when the first code block streams are multiplexed based on the common divisor or the maximum common divisor, multiplexing efficiency can be improved to a relatively large extent.

In an optional implementation, the at least one data code block in the second code block stream may further include at least one second-type data code block. For a data unit in at least one data unit included in the second code block stream, a preset code block in the data unit may carry multiplexing indication information, where the multiplexing indication information is used to indicate a quantity of multiplexed code blocks carried by the data unit and/or code blocks consecutively extracted from each of the Q first code block streams, where the preset code block includes any one of a head code block, a tail code block, a second-type data code block, and a third-type code block between two adjacent data units. In this way, it can be determined, by parsing the multiplexing indication information, whether demultiplexing needs to be performed subsequently, and optionally, a multiplexing rule of a communications device on a multiplexing side can be determined, to demultiplex the Q first code block streams.

According to a second aspect, an embodiment of this application may provide a data transmission method, including: receiving a second code block stream, where a non-synchronization header area of a code block in Q first code block streams may be carried in a non-synchronization header area of a code block in the second code block stream, Q is an integer greater than 1, a coding type of the second code block stream is M1/N1 bit coding, a coding type of the first code block stream may be M1/N1 bit coding, M1 is a positive integer, N1 is an integer not less than M1, one code block in the first code block stream includes a synchronization header area of (N1−M1) bits and a non-synchronization header area of M1 bits, and one code block in the second code block stream includes a synchronization header area of (N1−M1) bits and a non-synchronization header area of M1 bits; and demultiplexing the Q first code block streams. In this way, a code block stream can be multiplexed and demultiplexed at a code block granularity, the second code block stream arrives at a communications device on a demultiplexing side through at least one intermediate node, and the intermediate node does not demultiplex the second code block stream, so that an amount of data that needs to be processed by the intermediate node can be reduced, thereby reducing pressure on network management, operation, and maintenance.

In an optional implementation, the second code block stream may include at least one data unit. One data unit in the at least one data unit may include a head code block and at least one data code block; or one data unit in the at least one data unit may include a head code block, at least one data code block, and a tail code block; or one data unit in the at least one data unit includes at least one data code block and a tail code block. In this way, a boundary of the data unit may be determined by using the head code block and/or the tail code block, so that the communications device identifies a boundary of each data unit in the second code block stream, thereby laying a foundation for demultiplexing the Q first code block streams.

In an optional implementation, the at least one data code block may include at least one first-type data code block, or the at least one data code block may include at least one first-type data code block and at least one second-type data code block. A non-synchronization header area of a code block in the Q first code block streams may be carried in a non-synchronization header area of a first-type data code block in the second code block stream; and/or type indication information corresponding to a code block in the Q first code block streams may be carried in a non-synchronization header area of any one of the head code block, the second-type data code block, and the tail code block in the second code block stream. Type indication information corresponding to a code block may be used to indicate information carried in a synchronization header area of the code block. In this way, both information corresponding to a non-synchronization header area and information corresponding to a synchronization header area of a code block in the first code block stream may be correspondingly carried in the second code block stream, and a quantity of code blocks in a first code block stream multiplexed by a data unit in the second code block stream can be improved by increasing bits of an area of type indication information in the data unit, thereby improving transmission efficiency.

In an optional implementation, to be compatible with the prior art, the head code block may be an S code block, and/or the tail code block may be a T code block.

In an optional implementation, for a code block in the Q first code block streams that is carried in the second code block stream, the second code block stream may further include identifier indication information corresponding to the code block, where the identifier indication information may be used to indicate an identifier of a first code block stream corresponding to the code block. In this way, an identifier of a first code block stream corresponding to a non-synchronization header area of a code block that is extracted from the first code block stream and carried in the second code block stream can be indicated to the communications device on the demultiplexing side, thereby laying a foundation for demultiplexing the Q first code block streams by the communications device on the demultiplexing side.

In an optional implementation, the demultiplexing the Q first code block streams may also include: obtaining a non-synchronization header area of a code block in the Q first code block streams that is carried in a non-synchronization header area of the second code block stream, and determining, based on type indication information corresponding to the code block in the Q first code block streams that is carried in the second code block stream, a synchronization header area of the code block in the Q first code block streams that is carried in the non-synchronization header area of the second code block stream, to obtain a to-be-restored code block sequence; and demultiplexing the Q first code block streams based on the to-be-restored code block sequence; where for a code block that is in the Q first code block streams and whose non-synchronization header area is carried in the second code block stream, type indication information corresponding to the code block may be used to indicate information that is carried in a synchronization header area of the code block and that is used to indicate a code block type of the code block. In this way, a quantity of bits occupied by the type indication information can be compressed, so that the quantity of bits occupied by the type indication information is less than a quantity of bits carried in the synchronization header area, thereby transmitting information carried in the synchronization header area of the code block in the first code block stream, and also reducing an amount of data transmitted on the second code block stream.

In an optional implementation, an order of code blocks that are included in the to-be-restored code block sequence and extracted from the Q first code block streams may match an order of type indication information carried in the second code block stream. An order of code blocks that are included in the to-be-restored code block sequence and extracted from the Q first code block streams may match an order of the Q first code block stream. In this way, the demultiplexing side can determine, based on a relationship between the order of the code blocks and the order of the type indication information, type indication information corresponding to the code blocks that are included in the to-be-processed code block sequence and extracted from the Q first code block streams, and then restore information corresponding to the synchronization header area corresponding to the non-synchronization header area carried in the second code block stream.

In an optional implementation, for a first code block stream in the Q first code block streams, a quantity of consecutive code blocks corresponding to the first code block stream that are included in the to-be-restored code block sequence may be determined based on a bandwidth and a threshold of the first code block stream. In this way, a quantity of code blocks consecutively extracted from each first code block stream can be determined based on a bandwidth of the first code block stream, so that a transmission rate obtained after each first code block stream is multiplexed is relatively close to a transmission rate obtained before the first code block stream is multiplexed.

In an optional implementation, the threshold may be determined based on a common divisor or a maximum common divisor of Q bandwidths corresponding to the Q first code block streams. Because there may be multiple relationships between many service rates, when the first code block streams are multiplexed based on the common divisor or the maximum common divisor, multiplexing efficiency can be improved to a relatively large extent.

In an optional implementation, the at least one data code block in the second code block stream may further include at least one second-type data code block. For a data unit in at least one data unit included in the second code block stream, a preset code block in the data unit may carry multiplexing indication information, where the multiplexing indication information can be used to indicate a quantity of multiplexed code blocks carried by the data unit and/or code blocks consecutively extracted from each of the Q first code block streams, where the preset code block may include any one of a head code block, a tail code block, a second-type data code block, and a third-type code block between two adjacent data units. In this way, it can be determined, by parsing the multiplexing indication information, whether demultiplexing needs to be performed subsequently, and optionally, a multiplexing rule of a communications device on a multiplexing side can be determined, to demultiplex the Q first code block streams.

According to a third aspect, an embodiment of this application provides a communications device, and the communications device may include a memory, a transceiver, and a processor. The memory may be configured to store an instruction. The processor may be configured to: execute the instruction stored in the memory, and control the transceiver to receive and send a signal. When the processor executes the instruction stored in the memory, the communications device can be configured to execute the first aspect or any method in the first aspect.

According to a fourth aspect, an embodiment of this application provides a communications device, and the communications device may include a memory, a transceiver, and a processor. The memory may be configured to store an instruction. The processor may be configured to: execute the instruction stored in the memory, and control the transceiver to receive and send a signal. When the processor executes the instruction stored in the memory, the communications device may be configured to execute the second aspect or any method in the second aspect.

According to a fifth aspect, an embodiment of this application provides a communications device. The communications device may be configured to implement the first aspect or any method in the first aspect, and includes corresponding function modules separately configured to implement steps in the foregoing method. The function may be implemented by using hardware, or may be implemented by executing corresponding software by hardware. The hardware or the software includes one or more modules corresponding to the function.

In a possible design, a structure of the communications device may include a multiplexing/demultiplexing unit and a transceiver unit. These units may perform corresponding functions in the foregoing method examples. For details, refer to detailed descriptions in the method examples. Details are not described herein again.

According to a sixth aspect, an embodiment of this application provides a communications device. The communications device may be configured to implement the second aspect or any method in the second aspect, and includes corresponding function modules separately configured to implement steps in the foregoing method. The function may be implemented by using hardware, or may be implemented by executing corresponding software by hardware. The hardware or the software includes one or more modules corresponding to the function.

In a possible design, a structure of the communications device includes a multiplexing/demultiplexing unit and a transceiver unit. These units may perform corresponding functions in the foregoing method examples. For details, refer to detailed descriptions in the method examples. Details are not described herein again.

According to a seventh aspect, an embodiment of this application provides a computer storage medium, where the computer storage medium stores an instruction, and when the instruction runs on a computer, the computer may be enabled to perform the method in the first aspect or any possible implementation of the first aspect.

According to an eighth aspect, an embodiment of this application provides a computer storage medium, where the computer storage medium may store an instruction, and when the instruction runs on a computer, the computer may be enabled to perform the method in the second aspect or any possible implementation of the second aspect.

According to a ninth aspect, an embodiment of this application provides a computer program product that may include an instruction, and when the computer program product runs on a computer, the computer may be enabled to perform the method in the first aspect or any possible implementation of the first aspect.

According to a tenth aspect, an embodiment of this application provides a computer program product that may include an instruction, and when the computer program product runs on a computer, the computer may be enabled to perform the method in the second aspect or any possible implementation of the second aspect.

BRIEF DESCRIPTION OF DRAWINGS

FIG. 15 is a schematic diagram of data transmission according to an embodiment of this application;

FIG. 18 is a schematic flowchart of a data transmission method according to an embodiment of this application;

FIG. 19 is a schematic structural diagram of a communications device according to an embodiment of this application;

DESCRIPTION OF EMBODIMENTS

It should be understood that the technical solutions in embodiments of this application may be applied to various communications systems, for example, a communications system based on an Ethernet technology such as a mobile bearer fronthaul or backhaul field, a metropolitan multiservice bearer, data center interconnection, and industrial communication, and a communications system between different components or modules in an industrial or communications device.

Figure 4:
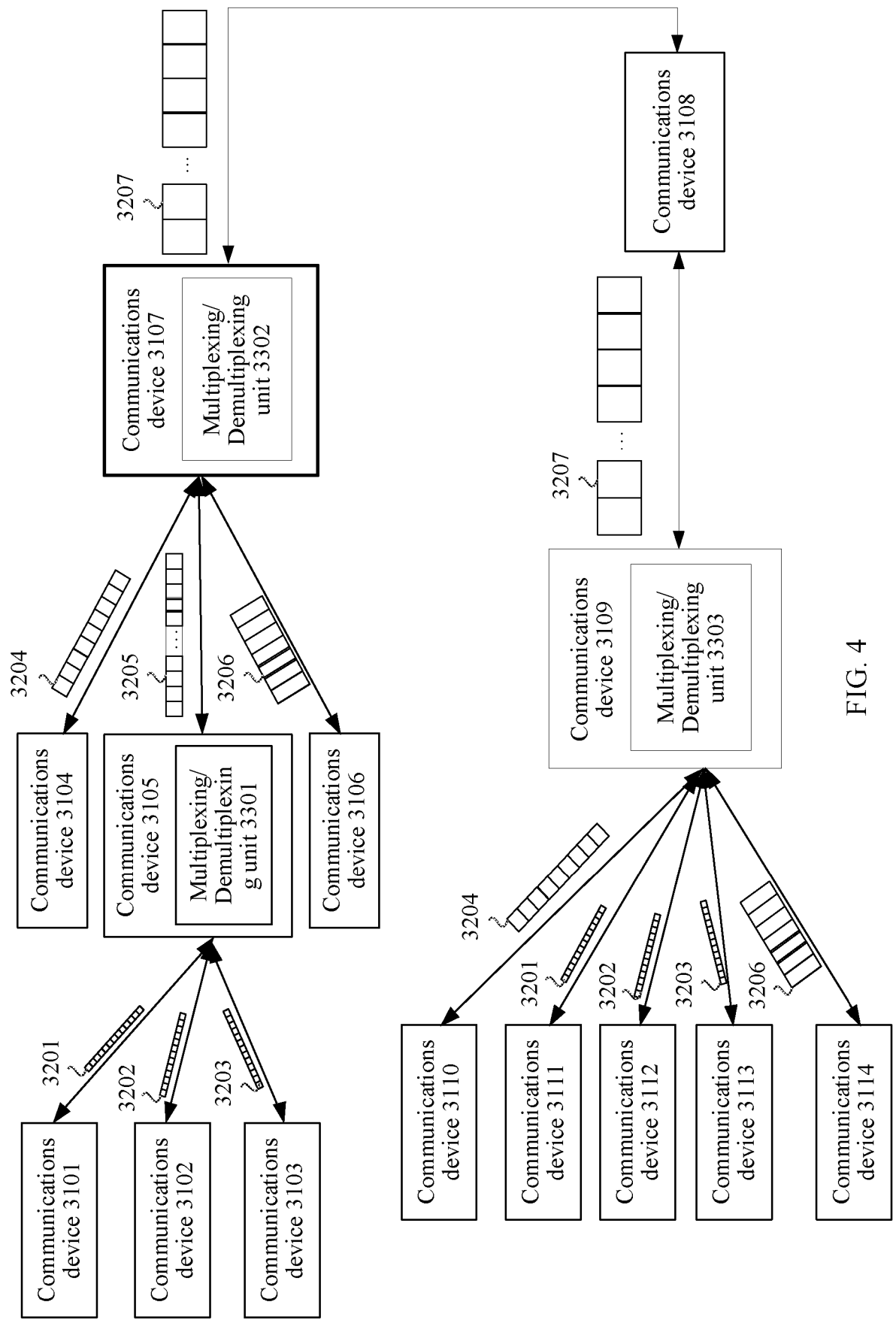
FIG. 4 is a schematic diagram of a communications system architecture applicable to an embodiment of this application.

FIG. 4 is an example schematic diagram of a communications system architecture applicable to an embodiment of this application. As shown in FIG. 4, the communications system may include a plurality of communications devices, and a code block stream is transmitted between the communications devices.

The communications device in this embodiment of this application may be a network device, for example, may be a communications device referred to as a PE node on a network edge of an X-E network, or may be a communications device referred to as a P node in a network in an X-E network, or may be used as a client device and connected to another bearer network such as an optical transport network (Optical Transport Network, OTN) or wavelength division multiplexing (Wavelength Division Multiplexing, WDM).

As shown in FIG. 4, the communications device provided in this embodiment of this application has a multiplexing/demultiplexing unit, such as a multiplexing/demultiplexing unit 3301 in a communications device 3105 shown in FIG. 4, a multiplexing/demultiplexing unit 3302 in a communications device 3107, and a multiplexing/demultiplexing unit 3303 in a communications device 3109. The communications device having the multiplexing/demultiplexing unit may multiplex (or interleave) a plurality of received code streams, or may demultiplex (or de-interleave) a received code stream. Descriptions are provided below with reference to FIG. 4 by using an example.

In FIG. 4, a communications device 3101 outputs a code block stream 3201 to the communications device 3105, a communications device 3102 outputs a code block stream 3202 to the communications device 3105, a communications device 3103 outputs a code block stream 3203 to the communications device 3105, the communications device 3105 includes the multiplexing/demultiplexing unit 3301, and the communications device 3105 may multiplex the received code block stream 3201, the received code block stream 3202, and the received code block stream 3203 into one code block stream 3205 for transmission.

Further, multilevel multiplexing may be implemented in this embodiment of this application. For example, in FIG. 4, the communications device 3105 may output the code block stream 3205 to the communications device 3107. Because the code block stream 3205 is already a multiplexed code block stream, the communications device 3107 may re-multiplex, by using the multiplexing/demultiplexing unit 3302, a code block stream 3204 output by a communications device 3104, a code block stream 3206 output by a communications device 3106, and the multiplexed code block stream 3205 output by the communications device 3105, and output a multiplexed code block stream 3207. This may be alternatively described as follows: The communications device 3107 multiplexes the code block stream 3204, the multiplexed code block stream 3205, and the code block stream 3206 into one code block stream 3207.

The multiplexed code block stream 3207 may be transmitted between the communications device 3107, a communications device 3108, and the communications device 3109. The multiplexing/demultiplexing unit in the communications device may further have a demultiplexing function. The multiplexing/demultiplexing unit 3303 in the communications device 3109 shown in FIG. 4 may demultiplex the received code block stream 3207, and send a demultiplexed code block stream to a corresponding communications device, for example, in FIG. 4, send a demultiplexed code block stream 3204 to a communications device 3110, send a demultiplexed code block stream 3201 to a communications device 3111, send a demultiplexed code block stream 3202 to a communications device 3112, send a demultiplexed code block stream 3203 to a communications device 3113, and send a demultiplexed code block stream 3206 to a communications device 3114.

In an optional implementation solution, the multiplexing/demultiplexing unit 3303 may first demultiplex the code block stream 3207 into a code block stream 3204, a code block stream 3205, and a code block stream 3206, and then the multiplexing/demultiplexing unit 3303 demultiplexes the code block stream 3205 into a code block stream 3201, a code block stream 3202, and a code block stream 3203. In an optional implementation, the multiplexing/demultiplexing unit 3303 in the communications device 3109 in FIG. 4 may include two multiplexing/demultiplexing subunits. One multiplexing/demultiplexing subunit is configured to demultiplex the code block stream 3207 into a code block stream 3204, a code block stream 3205, and a code block stream 3206, and send the code block stream 3205 to the other multiplexing/demultiplexing subunit, and the other multiplexing/demultiplexing subunit demultiplexes the code block stream 3205 into a code block stream 3201, a code block stream 3202, and a code block stream 3203.

Figure 5:
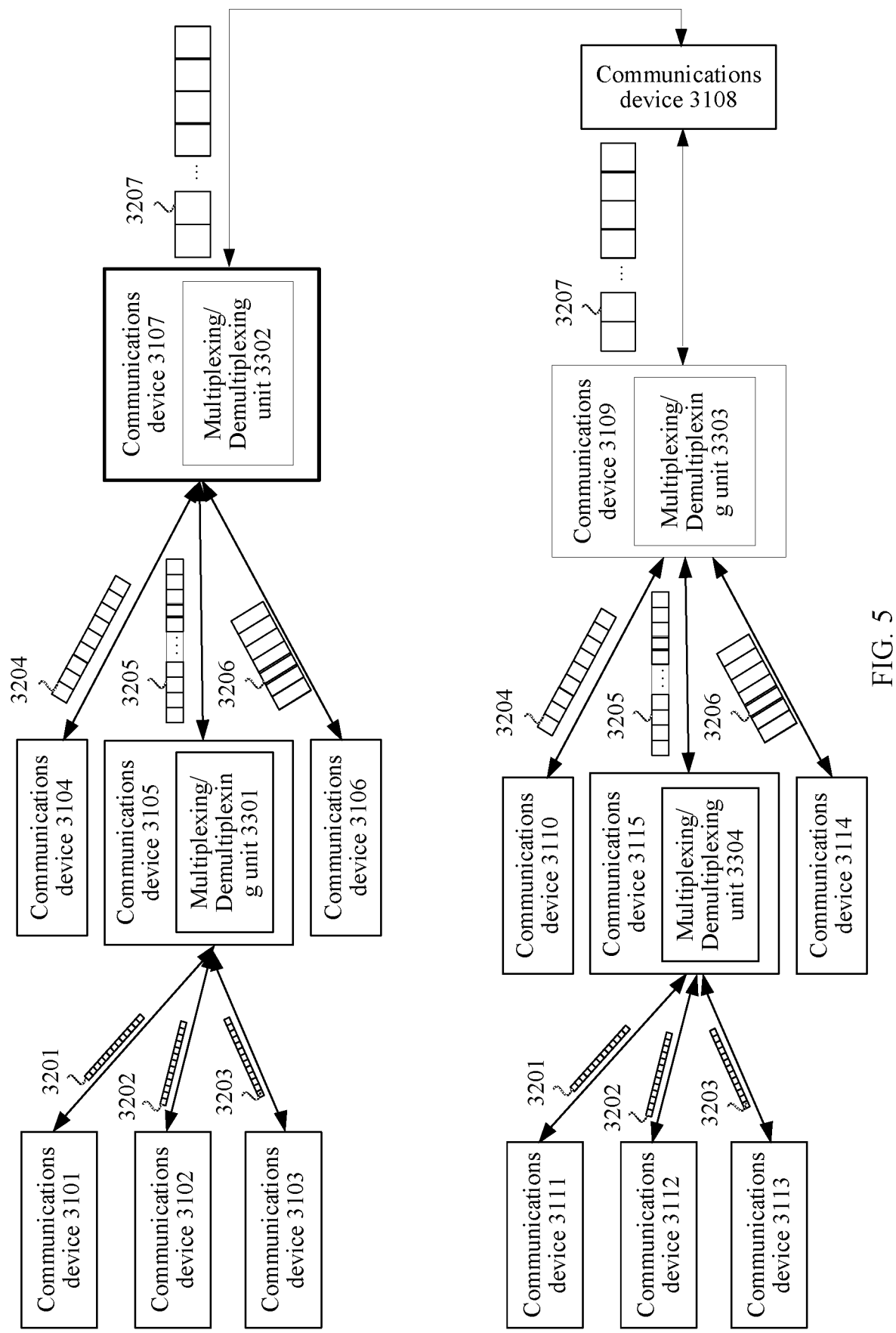
FIG. 5 is a schematic diagram of another communications system architecture applicable to an embodiment of this application.

FIG. 5 is an example schematic diagram of another communications system architecture applicable to an embodiment of this application. As shown in FIG. 5, a process in which a communications device 3109 receives a code block stream 3207 is the same as that in FIG. 4. Details are not described again. A difference from the solution shown in FIG. 4 is that a multiplexing/demultiplexing unit 3303 in the communications device 3109 in FIG. 5 demultiplexes the received code block stream 3207 into a code block stream 3204, a code block stream 3205, and a code block stream 3206, sends the code block stream 3204 to a communications device 3110, sends the code block stream 3205 to a communications device 3115, and sends the code block stream 3206 to a communications device 3114. A multiplexing/demultiplexing unit 3304 in the communications device 3105 demultiplexes the received code block stream 3205 into a code block stream 3201, a code block stream 3202, and a code block stream 3203, sends the code block stream 3201 to a communications device 3111, sends the code block stream 3202 to a communications device 3112, and sends the code block stream 3203 to a communications device 3113.

In other words, in the embodiments of this application, flexible configuration may be performed on both a multiplexing side and a demultiplexing side. For example, in FIG. 4, two-level multiplexing is performed by using the multiplexing/demultiplexing unit 3301 and the multiplexing/demultiplexing unit 3302, to obtain the code block stream 3207. On the demultiplexing side, as shown in FIG. 4, the code block stream may be demultiplexed into the code block stream 3204, the code block stream 3201, the code block stream 3202, the code block stream 3203, and the code block stream 3206 by using the multiplexing/demultiplexing unit 3303; or as shown in FIG. 5, the multiplexing/demultiplexing unit 3303 may first demultiplex the received code block stream 3207 into the code block stream 3204, the code block stream 3205, and the code block stream 3206, and then the multiplexing/demultiplexing unit 3304 demultiplexes the received code block stream 3205 into the code block stream 3201, the code block stream 3202, and the code block stream 3203.

It may be learned from the solutions shown in FIG. 4 and FIG. 5 that only one code block stream is transmitted between the communications device 3107, the communications device 3108, and the communications device 3109. A communications device on this transmission path processes only one multiplexed code block stream, and does not need to parse a plurality of multiplexed code block streams. It may be learned that, by using the solution provided in the embodiments of this application, a quantity of cross connections between intermediate nodes (the intermediate node is, for example, the communications device 3108 in FIG. 4) can be reduced, and a workload of network management, operation, and maintenance can be reduced.

Figure 1:
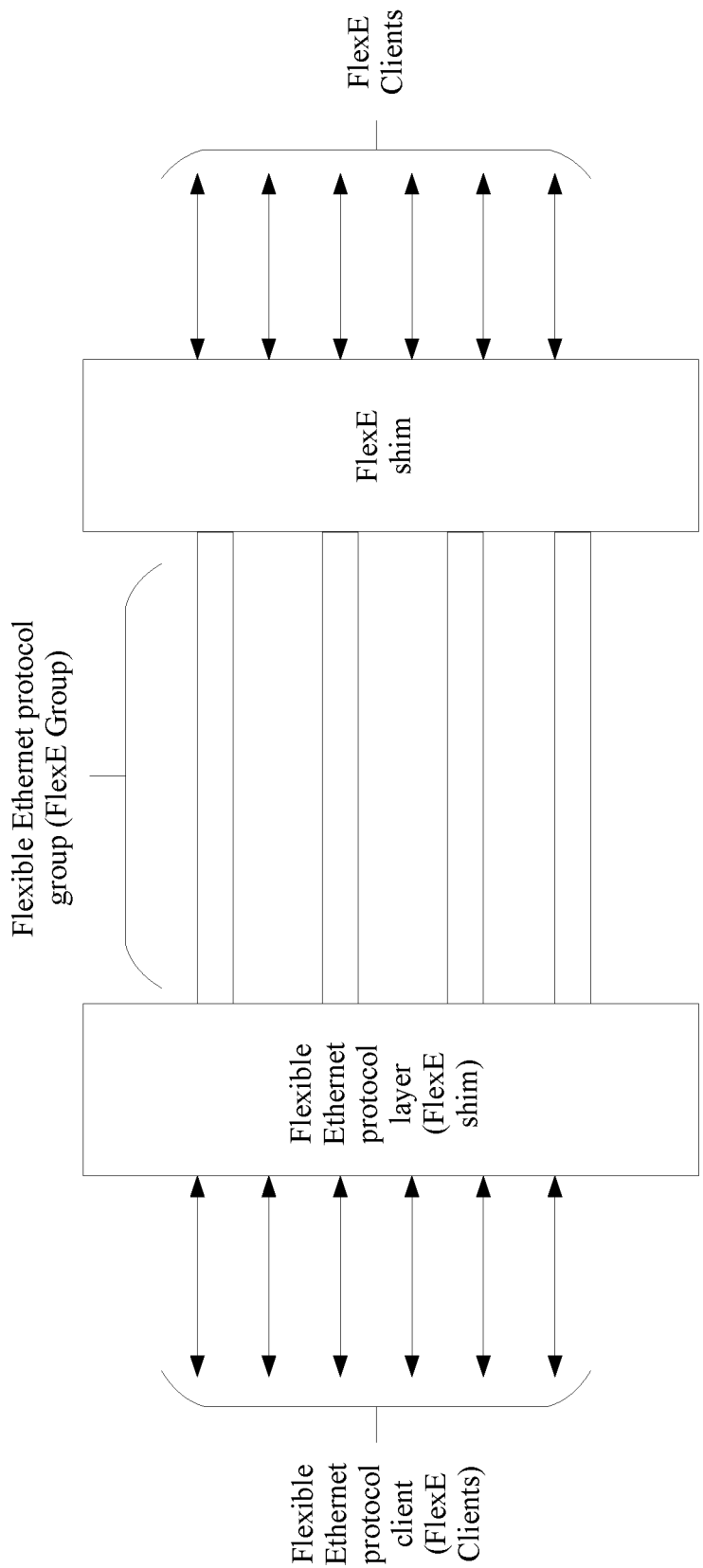
FIG. 1 is a schematic diagram of a communications system based on a flexible Ethernet protocol.
Figure 2:
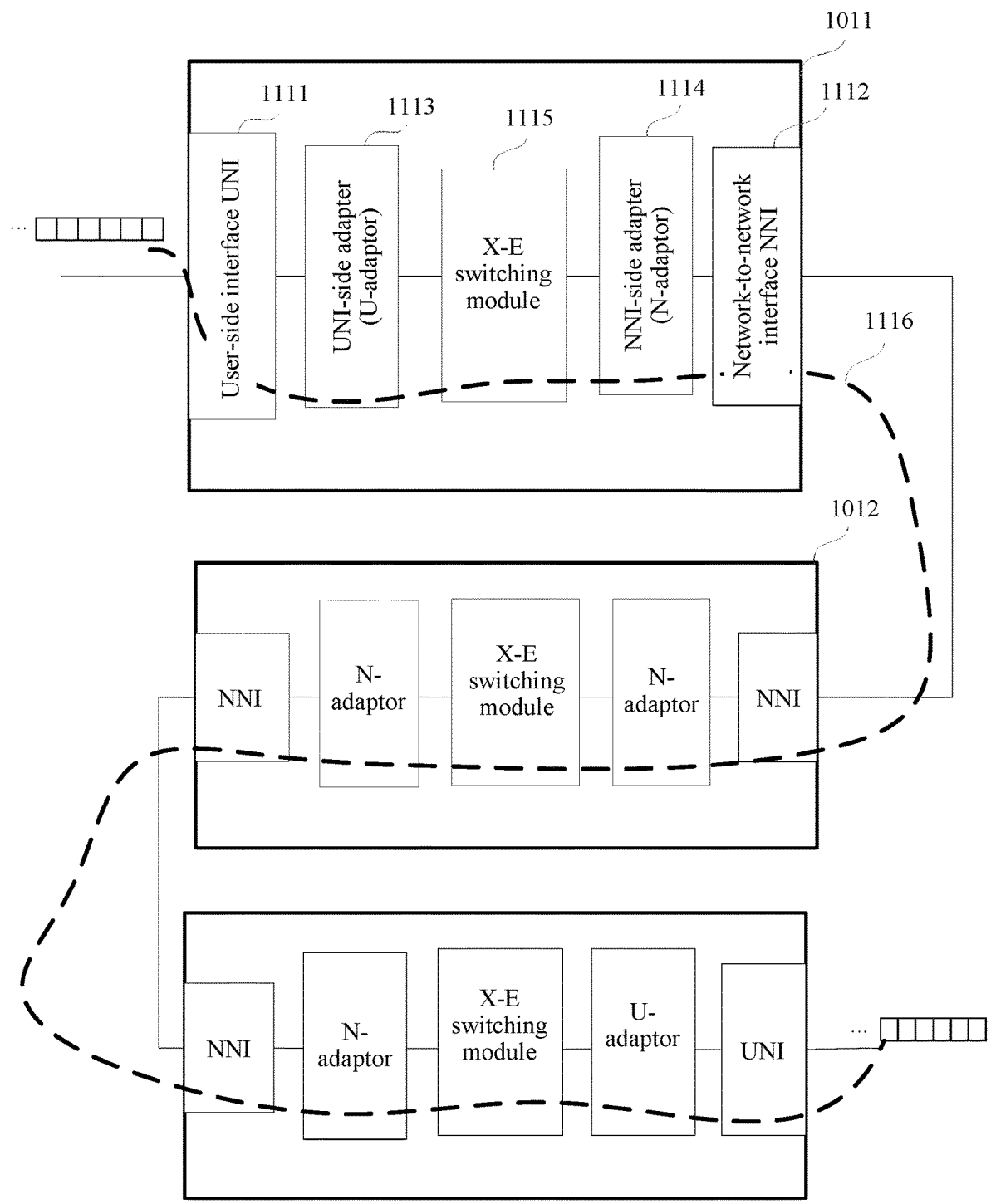
FIG. 2 is a schematic diagram of an X-E communications system architecture.
Figure 3:
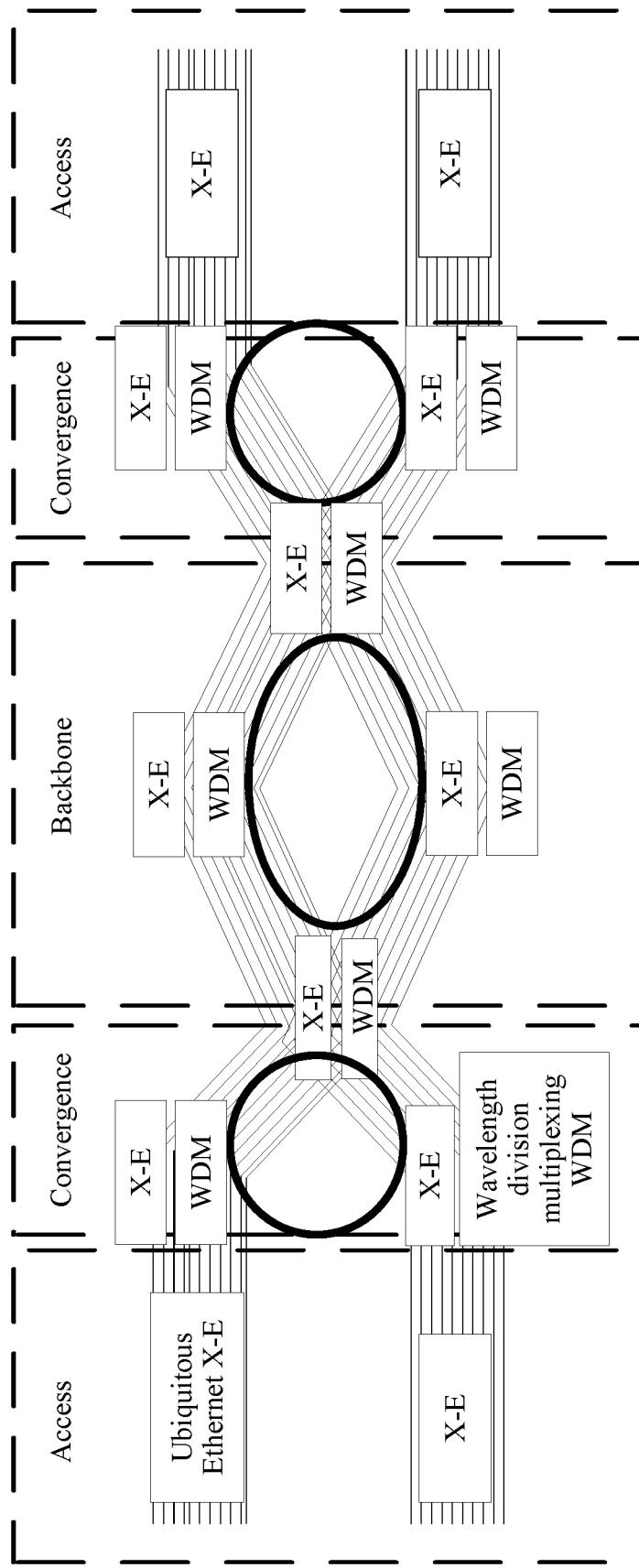
FIG. 3 is a schematic diagram of end-to-end communication.
Figure 6:
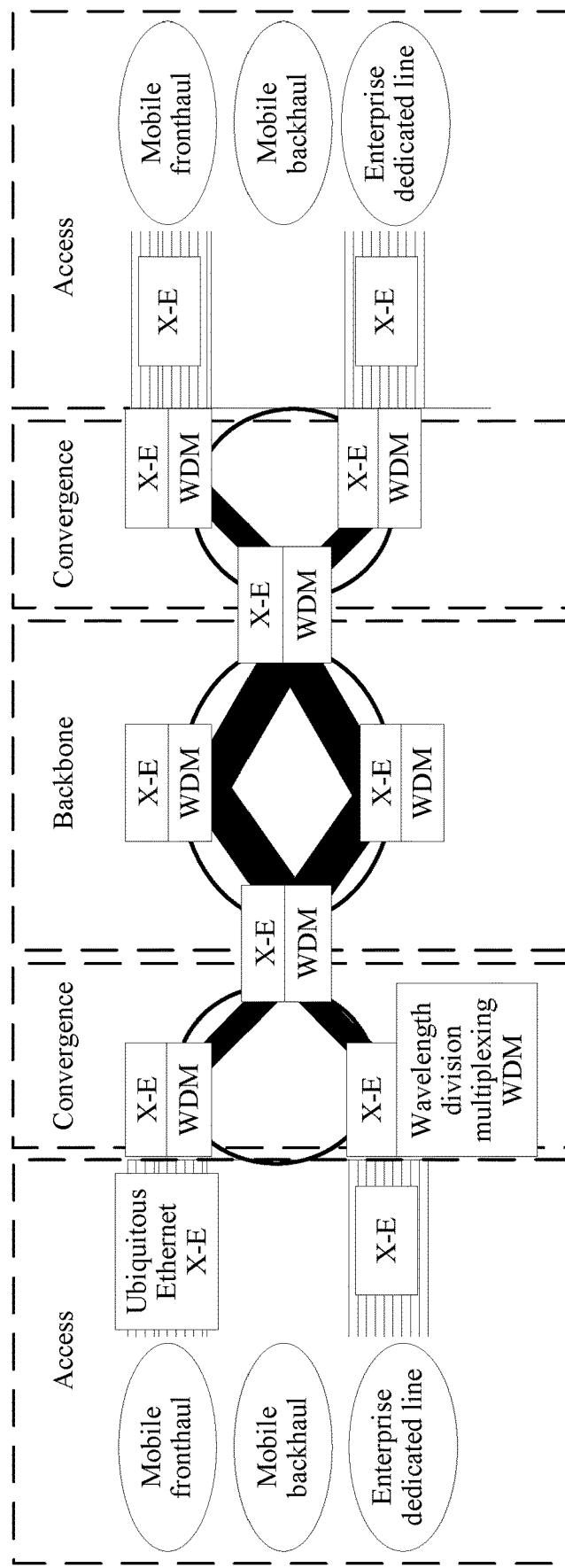
FIG. 6 is a schematic diagram of a network system architecture according to an embodiment of this application.

FIG. 6 is an example schematic diagram of a network system architecture according to an embodiment of this application. An X-Ethernet may be cross-connected based on a common data unit sequence stream on a legacy Ethernet interface, a fiber channel technology (FC) fiber channel interface, a common public radio interface (CPRI), a synchronous digital hierarchy SDH/SONET, an optical transport network OTN, and a FlexE interface, and provides an end-to-end networking technology independent of a specific protocol, and an exchanged object is a common data unit sequence stream. Rate adaptation of the data unit sequence stream to a FlexE slot or a corresponding physical interface may be implemented by adding or deleting an accompanying idle (IDLE) code block stream. Specifically, the cross connection may be performed based on a 64B/66B code block stream, or the cross connection may be performed based on a decoded common data unit stream of the 64B/66B code block stream. As shown in FIG. 6, a plurality of types of data, such as a mobile fronthaul CPRI, a mobile backhaul Ethernet, an enterprise SDH, and an Ethernet dedicated line, may be accessed on access sides at two ends. In the example of FIG. 6, after this embodiment of this application, is used, a convergence node (convergence shown in FIG. 6) in X-E may multiplex (multiplex) Q service code streams to one code stream, thereby reducing a quantity of cross connections that need to be processed by the convergence node and a backbone node. It may be learned from a comparison between FIG. 3 and FIG. 6 that, by using the solution provided in the embodiments of this application, a quantity of cross connections processed by a core node (for example, the convergence node and the backbone node in FIG. 6) on a data plane can be effectively reduced, and pressure on the core node can be reduced. * in the embodiments of this application indicates multiplication.

Figure 7:
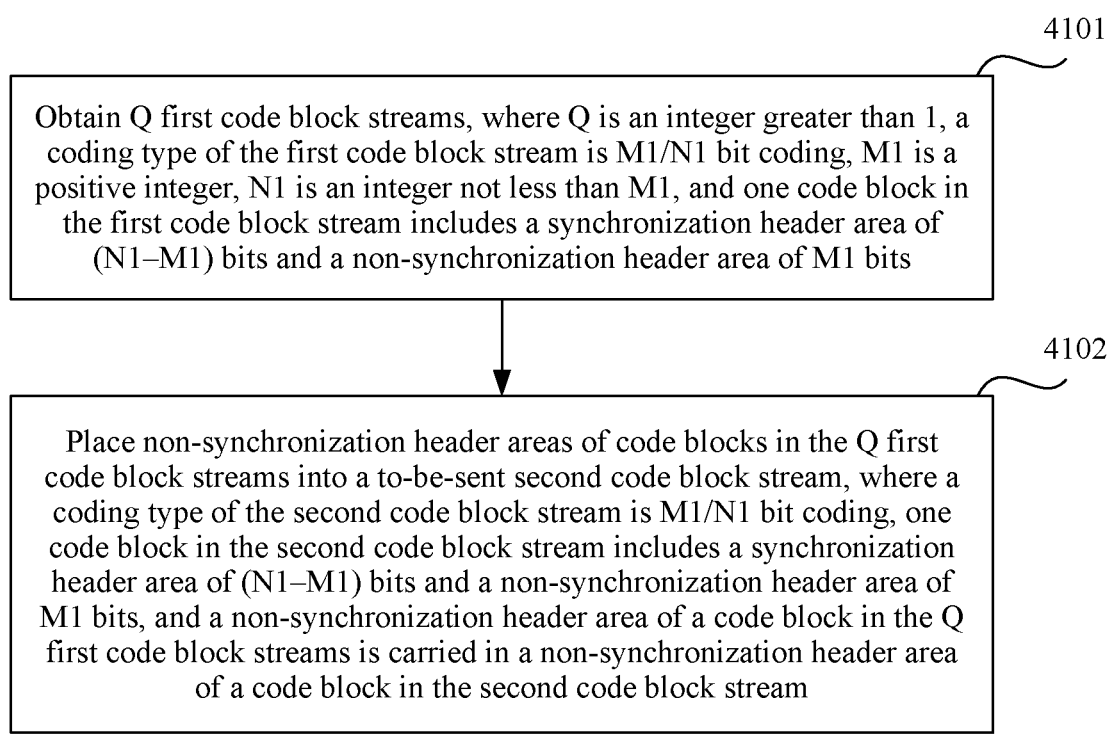
FIG. 7 is a schematic flowchart of a data transmission method according to an embodiment of this application.

Based on the foregoing descriptions, an embodiment of this application provides a data transmission method. A multiplexing side of the data transmission method may be executed by the communications device 3105 and the communications device 3107 in FIG. 4 and FIG. 5, and a demultiplexing side of the data transmission method may be executed by the communications device 3109 in FIG. 4 and the communications device 3205 in FIG. 5. In this embodiment of this application, a communications device on the multiplexing side may also be referred to as a first communications device, and a communications device on the demultiplexing side may be referred to as a second communications device. Optionally, a communications device may have a multiplexing capability and may also have a demultiplexing capability. In other words, the same communications device may be a first communications device on the multiplexing side in one data transmission link, and may be a second communications device on the demultiplexing side in another data transmission link process. FIG. 7 is an example schematic flowchart of a data transmission method according to an embodiment of this application. As shown in FIG. 7, the method includes the following steps.

Step 4101: A first communications device obtains Q first code block streams, where Q is an integer greater than 1, a coding type of the first code block stream is M1/N1 bit coding, M1 is a positive integer, N1 is an integer not less than M1, and one code block in the first code block stream includes a synchronization header area of (N1−M1) bits and a non-synchronization header area of M1 bits.

Step 4102: The first communications device places non-synchronization header areas of code blocks in the Q first code block streams into a to-be-sent second code block stream, where a coding type of the second code block stream is M1/N1 bit coding, one code block in the second code block stream includes a synchronization header area of (N1−M1) bits and a non-synchronization header area of M1 bits, and a non-synchronization header area of a code block in the Q first code block streams is carried in a non-synchronization header area of a code block in the second code block stream. Placing bits corresponding to the code blocks in the Q first code block streams into the to-be-sent second code block stream may also be described as multiplexing (or interleaving) the bits corresponding to the code blocks in the Q first code block streams into the to-be-sent second code block stream.

Optionally, when the solution provided in this embodiment of this application is applied to FIG. 4, there is at least one communications device between the communications device 3107 and the communications device 3109, and the communications device does not demultiplex a code block stream 3207 when receiving the code block stream 3207. In other words, the second code block stream arrives at a second communications device on a demultiplexing side through at least one intermediate node, and the intermediate node does not demultiplex the second code block stream. Optionally, the intermediate node may re-multiplex the second code block stream and another code block stream. This is not limited in this embodiment of this application. In the solution provided in this embodiment of this application, a code block stream is multiplexed and demultiplexed at a code block granularity. In this way, a plurality of first code block streams may be multiplexed by using the solution provided in step 4101 and step 4102, so that the plurality of first code block streams are multiplexed into a second code block stream for transmission, thereby reducing a quantity of cross connections that need to be processed by the intermediate node, and reducing pressure on network management, operation, and maintenance. Optionally, the intermediate node in this embodiment of this application is a communications device between the first communications device on a multiplexing side of a transmission path and the second communications device on the demultiplexing side.

In step 4101 and step 4102, in an optional implementation, M1 may be equal to N1. In this case, a quantity of bits carried in a synchronization header area included in a code block in the first code block stream is 0, and a quantity of bits carried in a synchronization header area included in one code block in the second code block stream is 0. Optionally, in this embodiment of this application, a code block (for example, a code block in the first code block stream and a code block in the second code block stream) may be written as a bit block in English, or is written as a block in English. In this embodiment of this application, a preset quantity of bits in a bitstream (the bitstream may be coded or pre-coded) may be referred to as a code block (the code block may also be referred to as a bit group or a bit block). For example, in this embodiment of this application, one bit may be referred to as a code block, and for another example, two bits may be referred to as a code block.

Figure 8:
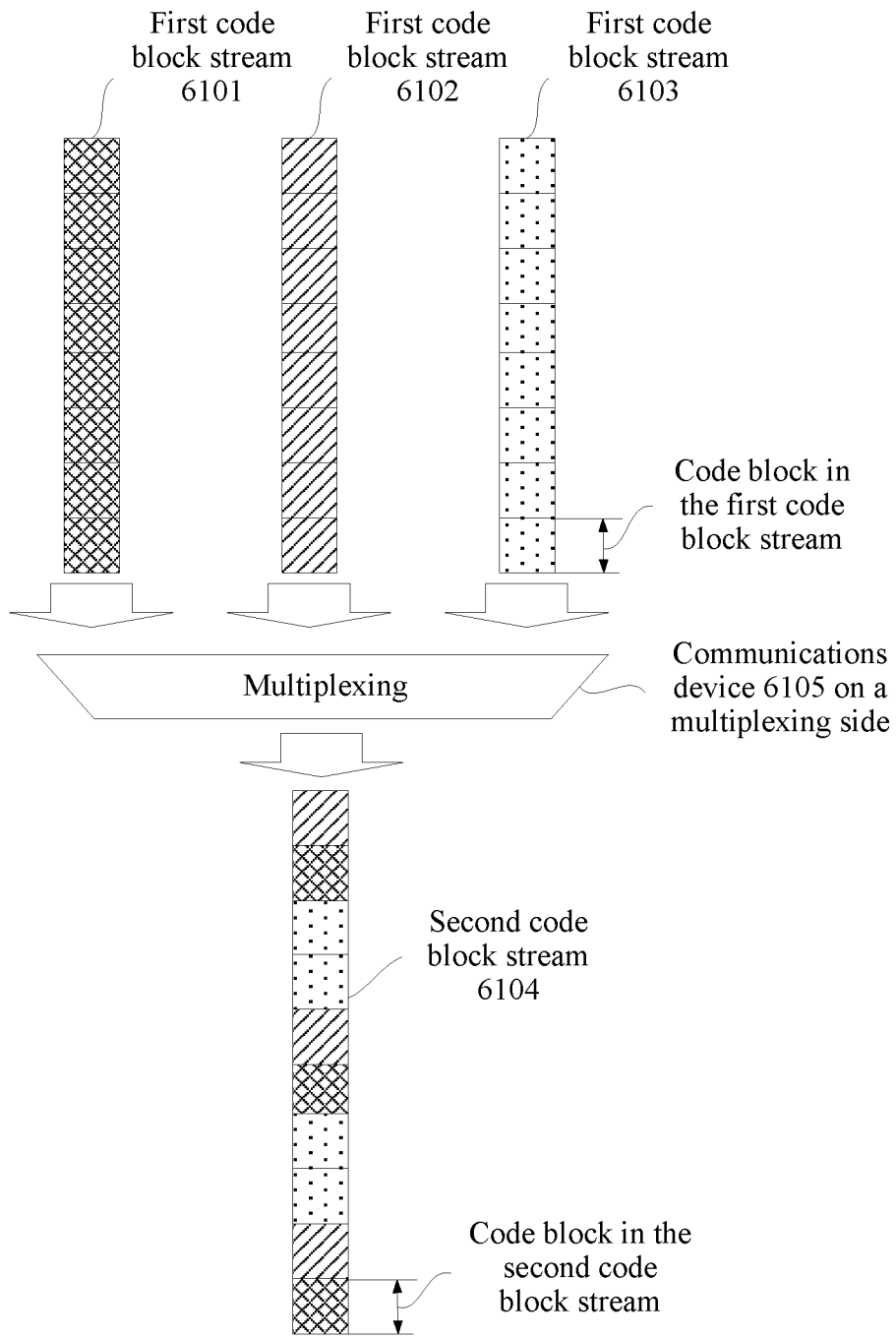
FIG. 8 is a schematic diagram of a data transmission method according to an embodiment of this application.

FIG. 8 is an example schematic diagram of a data transmission method according to an embodiment of this application. As shown in FIG. 8, in this embodiment of this application, when M1 is equal to N1, a quantity of bits carried in a synchronization header area included in a code block in a first code block stream is 0, and a quantity of bits carried in a synchronization header area included in a code block in a second code block stream is 0. In other words, a code block in the first code block stream and a code block in the second code block stream each include only a non-synchronization header area. In this case, an entire code block in the first code block stream may be placed in an area corresponding to a code block in the second code block stream. As shown in FIG. 8, there are three first code block streams: a first code block stream 6101, a first code block stream 6102, and a first code block stream 6103. A first communications device 6105 on a multiplexing side multiplexes the three first code block streams, and then outputs a second code block stream 6104. This example may be alternatively understood as follows: A preset quantity of bits in each of Q first code block streams is referred to as a code block, and a code block may be extracted from each first code block stream based on an order of the three first code block streams, and placed in an area of a code block in the second code block stream. The order of the Q first code block streams may be preset.

In this example, for each of the Q first code block streams, a quantity of code blocks consecutively extracted from the first code block stream may be flexibly configured based on a specific application scenario. In an optional implementation, the placing non-synchronization header areas of code blocks in the Q first code block streams into a to-be-sent second code block stream includes: extracting the code blocks from the Q first code block streams based on the order of the Q first code block streams, to obtain a to-be-processed code block sequence; and placing non-synchronization header areas of the code blocks in the to-beprocessed code block sequence into the to-be-sent second code block stream. In this embodiment of this application, for each of the Q first code block streams, a quantity of code blocks consecutively extracted from the first code block stream may be flexibly configured based on a specific application scenario. This embodiment of this application provides an optional implementation: For one of the Q first code block streams, a quantity of code blocks consecutively extracted from the first code block stream is determined based on a bandwidth and a threshold of the first code block stream. Optionally, the threshold is determined based on a common divisor or a maximum common divisor of Q bandwidths corresponding to the Q first code block streams. For example, the threshold is the common divisor or the maximum common divisor of the Q bandwidths corresponding to the Q first code block streams. In another optional implementation, the threshold may be preset. For example, the threshold is set to 1 Gbps.

As shown in FIG. 8, if a bandwidth (the bandwidth may also be referred to as a rate) of the first code block stream 6101 is 5 Gbps, a bandwidth of the first code block stream 6102 is 5 Gbps, and a bandwidth of the first code block stream 6103 is 10 Gbps, common divisors of the bandwidths 5, 5, and 10 of the three first code block streams are 1 and 5, and a maximum common divisor is 5. If the maximum common divisor is selected as a threshold, a quantity of code blocks consecutively extracted from the first code block stream 6101 is 1, a quantity of code blocks consecutively extracted from the first code block stream 6102 is 1, and a quantity of code blocks consecutively extracted from the first code block stream 6103 is 2. As shown in FIG. 8, in such an order as the first code block stream 6101, the first code block stream 6102, and the first code block stream 6103, one code block is consecutively extracted from the first code block stream 6101 and placed into a second code block stream 6104, and then one code block is consecutively extracted from the first code block stream 6102 and placed into the second code block stream 6104, and then two code blocks are consecutively extracted from the first code block stream 6103 and placed into the second code block stream 6104. Then, cyclically, one code block is consecutively extracted from the first code block stream 6101 again and placed into the second code block stream 6104, one code block is consecutively extracted from the first code block stream 6102 and placed into the second code block stream 6104, and so on. Details are not described.

When N1 is greater than M1, in an optional implementation, step 4102 may be that bits carried in a non-synchronization header area of a code block in the Q first code block streams are placed into a non-synchronization header area of a code block in the second code block stream, and bits carried in a synchronization header area of the code block in the first code block streams may be correspondingly placed into a non-synchronization header area of another code block in the second code block stream. For example, type indication information that can indicate information carried in the synchronization header area of the code block may be placed into the non-synchronization header area of another code block in the second code block stream. The type indication information that can indicate the information carried in the synchronization header area of the code block may be a bit carried in the synchronization header area of the code block, or may be other information. In other words, information carried in a synchronization header area of a code block in the first code block stream and information carried in a non-synchronization header area is split, and are separately placed into non-synchronization header areas of two code blocks in the second code block stream.

In this embodiment of this application, optionally, all bits corresponding to a non-synchronization header area of a code block in the Q first code block streams are correspondingly placed into a non-synchronization header area of a code block in the second code block stream. In other words, a non-synchronization header area in the first code block stream and a code block that is in the second code block stream and that carries bits corresponding to the non-synchronization header area are in a one-to-one correspondence.

In this embodiment of this application, the first code block stream may be alternatively a multiplexed code block stream. For example, in FIG. 4, after multiplexing the code block stream 3201, the code block stream 3202, and the code block stream 3203, the communications device 3105 outputs a multiplexed code block stream 3205. The communications device 3107 may then multiplex the code block stream 3204, the code block stream 3206, and the multiplexed code block stream 3205. In other words, nesting applications are supported in this embodiment of this application. In this embodiment of this application, for pipelines on an input side and an output side of the first communications device, if a pipeline used for transmitting a pre-multiplexed code block stream is referred to as a low-order pipeline, and a pipeline used for transmitting a multiplexed code block stream is referred to as a high-order pipeline, for example, a pipeline carrying the code block stream 3201, the code block stream 3202, and the code block stream 3203 in FIG. 4 is referred to as a low-order pipeline, a pipeline carrying the multiplexed code block stream 3205 is referred to as a high-order pipeline, and a pipeline carrying the code block stream 3207 is referred to as a higher-order pipeline, in this embodiment of this application, a code block on the low-order pipeline may be loaded into the high-order pipeline, and a code block on the high-order pipeline may be loaded into a higher-order pipeline, to implement nesting and multiplexing from the high-order pipeline to the higher-order pipeline.

The first communications device in this embodiment of this application may include a plurality of interfaces, and the interfaces may be classified into an interface on the input side and an interface on the output side based on data transmission directions. There are a plurality of interfaces on the input side, and there is one or more interfaces on the output side. Optionally, the interfaces of the first communications device may be pre-configured, and code block streams received by some or all of the interfaces on the input side may be multiplexed onto an interface on the output side. For example, the first communications device includes an interface 1, an interface 2, and an interface 3 on the input side, and includes an interface 4 and an interface 5 on the output side, code block streams received by the interface 1 and the interface 2 may be configured to be multiplexed and output through the interface 4, and a code block stream received by the interface 3 is output through the interface 5. Optionally, configuration information multiplexed between interfaces of the first communications device may be adjusted periodically or sporadically. Optionally, the content in this paragraph is also applicable to a second communications device; in other words, the second communications device may also configure a plurality of interfaces of the second communications device.

The following describes any code block stream in the Q first code block streams and the second code block stream involved in this embodiment of this application, and a code block in the Q first code block streams and the second code block stream. In the following descriptions, except a specially mentioned first code block stream and second code block stream, a mentioned code block stream is any code block stream in the Q first code block streams and the second code block stream. In the following descriptions, except a specially mentioned code block in the first code block stream and a specially mentioned code block in the second code block stream, a mentioned code block is any code block in the Q first code block streams and the second code block stream.

The code block stream (for example, the first code block stream and the second code block stream) defined in this embodiment of this application may be a data stream in a form of consecutive code blocks. In an optional implementation, M1 may be equal to N1. In this case, in this embodiment of this application, as described in the foregoing content, a preset quantity of bits in a bitstream (the bitstream may be coded or pre-coded) may be referred to as a code block (the code block may also be referred to as a bit group or a bit block). For example, in this embodiment of this application, one bit may be referred to as a code block, and for another example, two bits may be referred to as a code block. In another optional implementation, the code block defined in this embodiment of this application may be a code block obtained after a bitstream is coded by using a coding type. In this embodiment of this application, some coding manners are defined, such as M1/N1 bit coding.

In an optional implementation, M1 may be equal to N1. In this way, if a code block is divided into a synchronization header area and a non-synchronization header area, it may be understood as that a bit carried in the synchronization header area is 0, or it may be understood as that a preset quantity of bits is referred to as a code block.

Figure 9:
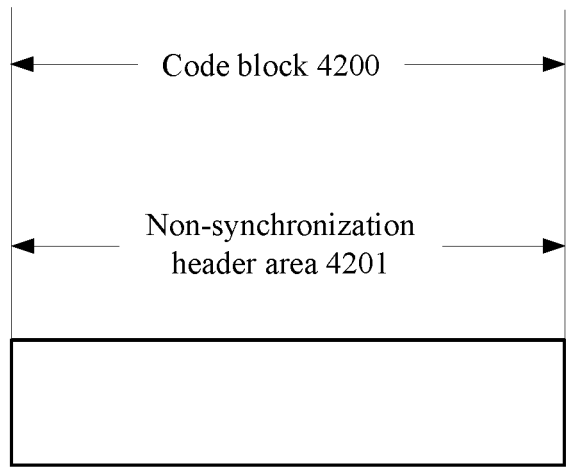
FIG. 9 is a schematic structural diagram of a code block according to an embodiment of this application.

In another optional implementation, N may be greater than M, but there is no explicit synchronization header. For example, in code blocks obtained after direct current balancing is implemented by performing coding by using 8B/10B bit coding, there are 1024 8B/10B code block samples with an information length of 10 bits, which are far greater than 256 code block samples required by an information length of 8 bits. A reserved code block sample may be used to implement 8B/10B code block synchronization and identify a boundary of an 8B/10B code block. The 8B/10B code block includes only a non-synchronization header area. FIG. 9 is an example schematic structural diagram of a code block according to an embodiment of this application. As shown in FIG. 9, a bit carried in a synchronization header area included in a code block 4200 is 0, and all bits included in the code block 4200 are bits carried in a non-synchronization header area 4201. The code block shown in FIG. 9 may be a code block in the first code block stream shown in FIG. 8, or may be a code block in the second code block stream.

Figure 10:
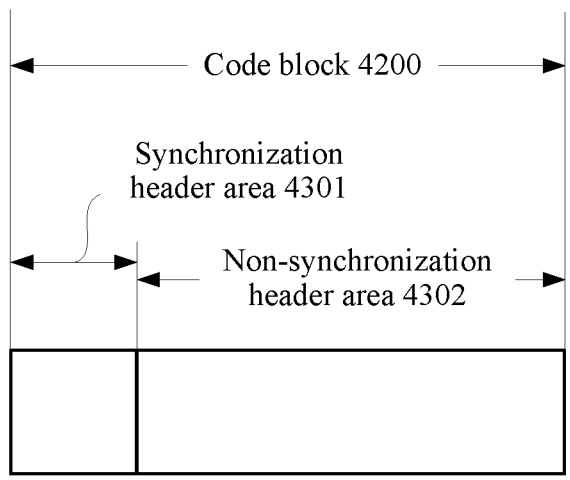
FIG. 10 is a schematic structural diagram of another code block according to an embodiment of this application.

In an optional implementation in which N may be greater than M, for example, M1/N1 bit coding may be 64B/66B coding (or may be written as 64/66 bit coding) defined in 802.3. As defined in this standard, a code block may include a synchronization header area and a non-synchronization header area. In this embodiment of this application, a code block that is coded by using M1/N1 bit coding may be a code block whose non-synchronization header area includes M1 bits and whose total quantity of bits of a coded code block is N1 bits. The code block that is coded by using M1/N1 bit coding may be alternatively described as a code block including M1 bits in a non-synchronization header area and several bits in a synchronization header area. FIG. 10 is an example schematic structural diagram of another code block according to an embodiment of this application. As shown in FIG. 10, a code block 4200 includes a synchronization header area 4301 and a non-synchronization header area 4302. Optionally, a quantity of bits carried in the non-synchronization header area 4302 is M1, and a quantity of bits carried in the synchronization header area 4301 is (N1−M1). Information carried in the synchronization header area 4301 in this embodiment of this application may be used to indicate a type of a code block, and the type of the code block may include a control type, a data type, and some other types.

In actual application, a code block stream obtained after M1/N1 bit coding may be transmitted on an Ethernet physical layer link. The M1/N1 bit coding may be 8B/10B coding used in a 1G Ethernet, in other words, a code block stream (the code block stream may be alternatively referred to as a block stream in English) of an 8B/10B coding type is transmitted on a 1 GE physical layer link; or the M1/N1 bit coding may be 64B/66B coding used in 10 GE, 40 GE, and/or 100 GE, in other words, a 64B/66B code block stream is transmitted on a 10 GE, 40 GE, and/or 100 GE physical layer link. With the development of Ethernet technology in the future, there may be other coding and decoding. The M1/N1 bit coding in this embodiment of this application may be alternatively some coding types in the future, such as 128B/130B coding and 256B/257B coding. In actual application, the code block may be a code block (which may also be referred to as an 8B/10B code block) obtained by using 8B/10B coding and a code block (which may also be referred to as a 64B/66B code block) obtained by using 64B/66B coding that is obtained based on Ethernet physical coding sublayer (Physical Coding Sublayer, PCS) coding already specified in IEEE 802.3. For another example, the code block in this embodiment of this application may be a code block (which may be referred to as a 256B/257B code block) obtained by a forward error correction (Forward Error Correction, FEC) subsystem by using 256B/257B coding. For another example, the code block in this embodiment of this application may be a code block (which may also be referred to as a 64B/65B code block) obtained by using a 64B/65B code block obtained based on 64B/66B transcoding in ITU-T G.709, or a 512B/514B code block. For another example, the code block in this embodiment of this application may be a code block (which may also be referred to as a 64B/67B code block) obtained by using 64B/67B coding in the Interlaken bus specification.

Structure forms of some code blocks are specified in the prior art, such as an S code block, a data code block, a T code block, and an idle code block. Code blocks (for example, a code block in a first code block stream and a code block in a second code block stream) in the embodiments of this application may be these code blocks specified in the prior art. FIG. 10 is an example schematic structural diagram of an 0 code block whose type field is 0x4B according to an embodiment of this application. As shown in FIG. 10, a code block 4200 in this embodiment of this application is an O code block, information carried in a synchronization header area 4301 included in the code block 4200 is "SH10", and "SH10" means that a type of the code block 4200 is a control type. A non-synchronization header area 4302 includes a payload area 4303 and a non-payload area 4304. The non-payload area 4304 may be used to carry the type field "0x4B", "00", and reserved fields "C4 to C7", and all the reserved fields "C4 to C7" may be filled with "0x00". Optionally, "00" may be filled with a feature command word such as "0x0", "0xF", or "0x5" related to the prior art, and a feature command word such as "0xA", "0x9", or "0x3" that is not used in the prior art, to be different from the prior art. Some information may be indicated by content filled in the field "00". Optionally, a head code block in this embodiment of this application may be alternatively a code block including S in characters of the code block, or may be a new code block such as a newly defined O code block. For example, the head code block is the O code block whose type field is 0x4B in FIG. 10, and for another example, the head code block may be an S code block whose type field is 0x33 and that corresponds to standard 64B/66B coding, or an S code block whose type field is 0x66 and that corresponds to standard 64B/66B coding. Some high-speed Ethernets such as 100 GE, 200 GE, and 400GE include only one type of S code block whose type field is 0x78 and that includes a data payload of 7 bytes. However, for some low-speed Ethernets such as 10 GE or 25 GE, S code blocks may include code blocks whose type fields are 0x78, 0x33, and 0x66, or may include another code block that includes a character S in characters; and the S code block may include a data payload of 4 bytes. In an optional implementation, because an S code block in a legacy Ethernet is exactly obtained by coding a 7-byte preamble and a 1-byte start of frame delimiter (Start of Frame Delimiter, SFD), in a possible bit pattern of the S code block, the synchronization header area 4301 is "10", a type field of the non-payload area 4304 is "0x78", the entire payload area 4303 is subsequently filled with "0x55", and the entire non-payload area 4304 after the payload area 4303 is filled with "0x55" except that the last byte is filled with "0xD5".

Figure 12:
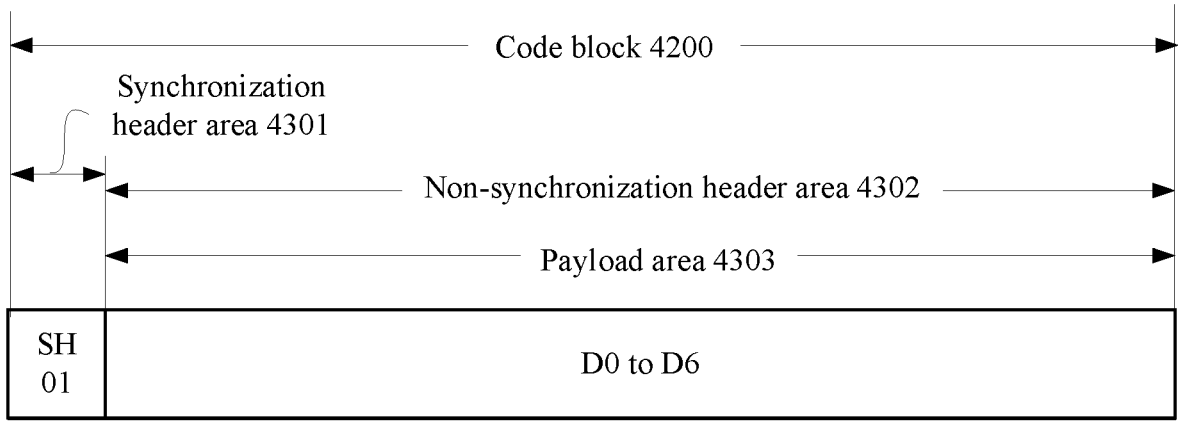
FIG. 12 is a schematic structural diagram of a data code block according to an embodiment of this application.

The code block in this embodiment of this application may be a data code block. FIG. 12 is an example schematic structural diagram of a data code block according to an embodiment of this application. As shown in FIG. 12, a code block 4200 in this embodiment of this application is a data code block, information carried in a synchronization header area 4301 included in the code block 4200 is "SH01", and "SH01" means that a type of the code block 4200 is a data type. A non-synchronization header area 4302 includes a payload area 4303. The entire non-synchronization header area of the data code block is the payload area, that is, a payload area shown by D0 to D7.

Figure 13:
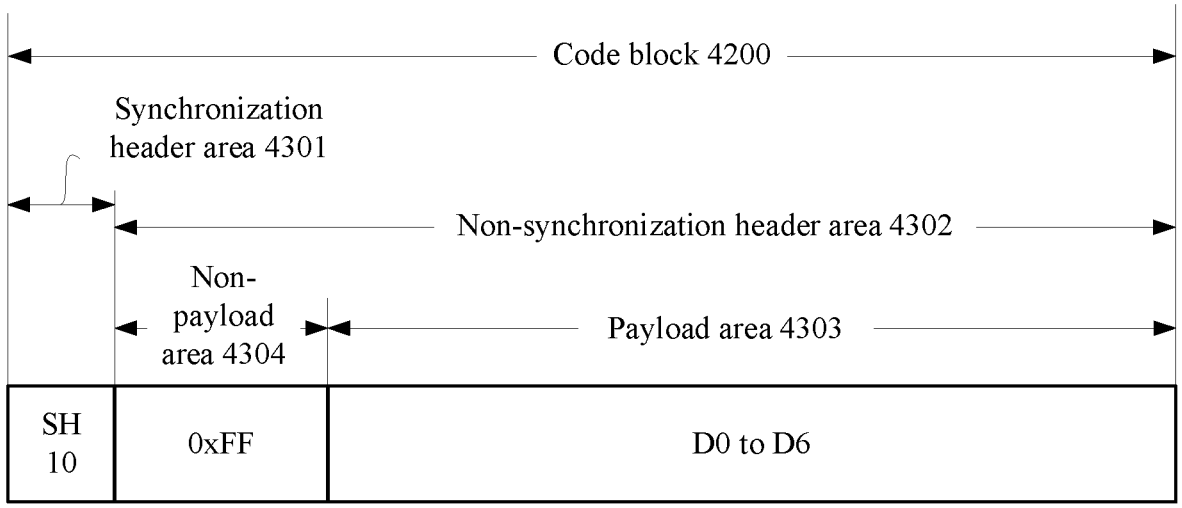
FIG. 13 is a schematic structural diagram of a T7 code block according to an embodiment of this application.

The code block in this embodiment of this application may be a T code block. The T code block may be a code block including T in characters of the code block, and the T code block may include any code block in T0 to T7, for example, a T0 code block whose type field is 0x87, a T1 code block whose type field is 0x99, and a T7 code block whose type field is 0xFF. FIG. 13 is an example schematic structural diagram of a T7 code block according to an embodiment of this application. As shown in FIG. 13, a code block 4200 in this embodiment of this application is a T7 code block, information carried in a synchronization header area 4301 included in the code block 4200 is "SH10", and "SH10" means that a type of the code block 4200 is a control type. A non-synchronization header area 4302 includes a payload area 4303 and a non-payload area 4304. The non-payload area 4304 may be used to carry a type field "0xFF". Type fields of T0 to T7 code blocks are respectively 0x87, 0x99, 0xAA, 0xB4, 0xCC, 0xD2, 0xE1, and 0xFF. All the T0 to T7 code blocks are applicable to various Ethernet interfaces using 64B/66B coding. It should be noted that the T1 to T7 code blocks respectively include payload areas of one to seven bytes. Optionally, the payload area in the T code block may be used to carry a bit corresponding to a code block extracted from a first code block stream; or may not be used to carry a bit corresponding to a code block extracted from a first code block stream, for example, the entire payload area may be filled with 0, or is used to carry other indication information. C1 to C7 in the T0 to T6 code blocks may be processed based on an existing Ethernet technology. To be specific, seven idle control bytes (bytes C1 to C7) after a character T each are 7-bit 0x00 after being coded. For example, for a T code type of 0xFF, D0 to D6 may be all filled with 8-bit "0x00", and are reserved.

Figure 14:
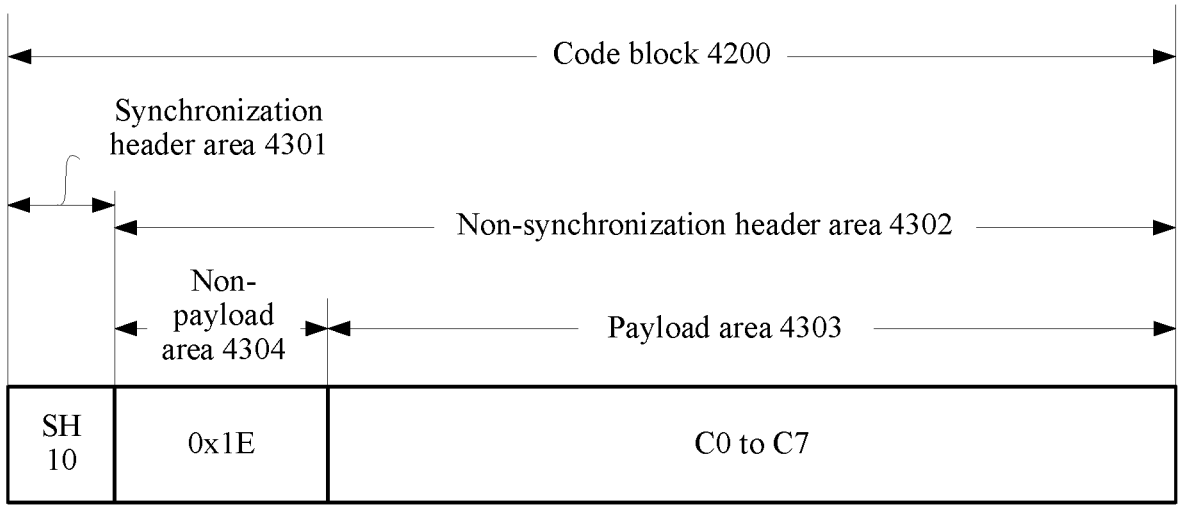
FIG. 14 is a schematic structural diagram of an idle code block according to an embodiment of this application.

The code block in this embodiment of this application may be an idle code block. FIG. 14 is an example schematic structural diagram of an idle code block according to an embodiment of this application. As shown in FIG. 14, a code block 4200 in this embodiment of this application is an idle code block, information carried in a synchronization header area 4301 included in the code block 4200 is "SH10", and "SH10" means that a type of the code block 4200 is a control type. A non-synchronization header area 4302 is used to carry a type field "0x1E", and content carried in other fields "C0 to C7" of the non-synchronization header area 4302 is "0x00". In this embodiment of this application, a second code block stream includes at least one data unit, and the idle code block may be added between a head code block and a tail code block of a data unit, or may be added between data units.

Based on the foregoing content, an embodiment of this application provides a possible structure form of the second code block stream. It may be learned by a person skilled in the art that a structure form of the first code block stream may be a structure form defined in the prior art, or may be similar to or the same as the structure form of the second code block stream in this embodiment of this application, and this is not limited in this embodiment of this application. Several possible structure forms of the second code block stream are described below.

Optionally, the second code block stream corresponds to at least one data unit. One data unit may include a plurality of structure forms. For example, in a first structure form, a data unit corresponding to the second code block stream may include a head code block and at least one data code block. In a second structure form, a frame delimitation format of an existing Ethernet is considered to be compatible with and reused; to be specific, a typical Ethernet preamble, a start code block (the start code block may be alternatively an S code block) corresponding to the Ethernet preamble, an idle frame spacing byte, and an end code block (the end code block may be a T code block) and an idle code block corresponding to the idle frame spacing byte are reserved. Optionally, a data unit corresponding to the second code block stream may include a head code block, at least one data code block, and a tail code block. In a third structure form, a data unit corresponding to the second code block stream may include at least one data code block and a tail code block. The head code block and the tail code block may be used to carry some information, and may further serve to determine a data unit, for example, the head code block and the tail code block serve to limit a boundary for a data unit. In another possible structure form, a data unit corresponding to the second code block stream may include at least one data code block, for example, a quantity of data code blocks included in one data unit may be set.

In an optional implementation, in the plurality of structure forms in the foregoing example, a data code block in a data unit in the second code block stream may include at least one first-type data code block. In another optional implementation, in the plurality of structure forms in the foregoing example, a data code block in a data unit in the second code block stream may include at least one first-type data code block and at least one second-type data code block, and a data code block other than the first-type data code block included in the data unit may be referred to as the second-type data code block. A non-synchronization header area of a code block in the Q first code block streams is carried in a non-synchronization header area of a first-type data code block in the second code block stream. Optionally, type indication information corresponding to a code block in the Q first code block streams is carried in a non-synchronization header area of any one of the head code block, the second-type data code block, and the tail code block in the second code block stream. Type indication information corresponding to a code block in the Q first code block streams is used to indicate information carried in a synchronization header area of the code block. Type indication information corresponding to a code block in the Q first code block streams may be information carried in a synchronization header area of the code block, or may be information that can indicate information carried in a synchronization header area of the code block. A quantity of second-type data code blocks may be 0 or may not be 0.

Optionally, in this embodiment of this application, a head code block and a tail code block in a data unit in the second code block stream may be some newly disposed code blocks that have a fixed format. The head code block and the tail code block may serve as a boundary of the data unit, and may also carry some information. Optionally, to be compatible with a technology, the head code block may be an O code block, and the O code block may be the code block whose type field is 0x4B in FIG. 10. Optionally, the head code block may be alternatively another S code block that includes a character S and that is defined in the prior art. For example, the head code block may be an S code block whose type field is 0x33 or an S code block whose type field is 0x78. Further, optionally, when the head code block is an O code block, information may be added to a preset field of the O code block, to be different from the prior art. The preset field may be an unused feature command word such as a feature command word 0=0xA, 0x9, or 0x3 in the O code block, and certainly, a code block of a 0x00 type that is still reserved may also be used. As shown in FIG. 14, the head code block may include a synchronization header area and a non-synchronization header area, and the non-synchronization header area includes a non-payload area and a payload area.

In another optional implementation, the tail code block may be a T code block. The T code block may be the T7 code block whose type field is 0xFF in FIG. 12, or may be another T code block defined in another prior art, for example, any one of the foregoing T0 to T6 code blocks. Packaging of the data unit in the second code block stream that is performed by using the S code block and the T code block can be compatible with the prior art, and a pipeline carrying the second code block stream may pass through a deployed X-Ethernet switching node and a deployed FlexE client switching node that currently support flat networking. The pipeline carrying the second code block stream may also be referred to as a high-order pipeline, and a pipeline carrying the first code block stream may also be referred to as a low-order pipeline.

In addition, optionally, a data unit in the second code block stream may further include some idle code blocks. A location of the idle code block in the data unit may be preconfigured, or may be at random.

Optionally, some other code blocks may be configured between adjacent data units in the second code block stream, for example, may be a control code block, may be a data code block, or may be a code block of another code block type. For example, any one or more of some idle code blocks, S code blocks, and the code blocks shown in FIG. 14 are configured between adjacent data units in the second code block stream. The adjacent data units in the second code block stream may be spaced by one or more idle code blocks. A quantity of idle code blocks by which the adjacent data units in the second code block stream are spaced may be a variable, and may be adjusted based on a specific application scenario. In an optional implementation, there may be at least two groups of adjacent data units (each group of adjacent data units includes two adjacent data units) in the second code block stream, and quantities of idle code blocks by which the two groups of adjacent data units are spaced are not equal. Optionally, the idle code blocks by which the adjacent data units in the second code block stream are spaced are properly increased or deleted, in other words, the idle code blocks are adaptively increased or decreased, to implement frequency or rate adaptation. For example, if a bandwidth of the pipeline carrying the second code block stream is relatively small, idle code blocks between data units in the second code block stream may be properly decreased. In a possible implementation, idle code blocks between adjacent data units are decreased to zero, in other words, there is no idle code block between two adjacent data units. For another example, if a bandwidth of the pipeline carrying the second code block stream is relatively large, idle code blocks between data units in the second code block stream may be properly increased. In another possible implementation, an idle code block may be inserted at any location of the second code block stream, to implement frequency or rate adaptation. However, when a rate difference and a bandwidth difference are relatively small, it may be recommended to insert an idle code block between two data units. For example, a quantity of idle code blocks between data units may be increased from one to two or more.

In an implementation of this application, the non-synchronization header area of the code block in the first code block stream is correspondingly carried in the non-synchronization header area of the code block in the second code block stream. In an optional implementation, an agreement may be made between the first communications device on the multiplexing side and the second communications device on the demultiplexing side, so that the second communications device on the demultiplexing side demultiplexes the Q first code block streams from the second code block stream based on the agreement. In another optional implementation, for a code block in the Q first code block streams that is carried in the second code block stream, the second code block stream further includes identifier indication information corresponding to the code block, and the identifier indication information is used to indicate an identifier of a first code block stream corresponding to the code block. In this way, the identifier indication information is sent to the second communications device on the demultiplexing side, so that the demultiplexing side can determine a first code block stream corresponding to a non-synchronization header area of each code block that is carried in the second code block stream and that is extracted from the Q first code block streams, to demultiplex each first code block stream. Identifier indication information corresponding to a code block in the Q first code block streams that is carried in the second code block stream may be an identifier of a first code block stream corresponding to the code block, or may be other information that can indicate the information, for example, location information of the code block in the second code block stream and an identifier of the first code block stream.

In another optional implementation, the placing non-synchronization header areas of code blocks in the Q first code block streams into a to-be-sent second code block stream includes: extracting the code blocks from the Q first code block streams based on an order of the Q first code block streams, to obtain a to-be-processed code block sequence; and placing non-synchronization header areas of the code blocks in the to-be-processed code block sequence into the to-be-sent second code block stream. In this embodiment of this application, for each of the Q first code block streams, a quantity of code blocks consecutively extracted from the first code block stream may be flexibly configured based on a specific application scenario. This embodiment of this application provides an optional implementation: For one of the Q first code block streams, a quantity of code blocks consecutively extracted from the first code block stream is determined based on a bandwidth and a threshold of the first code block stream. Optionally, the threshold is determined based on a common divisor or a maximum common divisor of Q bandwidths corresponding to the Q first code block streams. For example, the threshold is the common divisor or the maximum common divisor of the Q bandwidths corresponding to the Q first code block streams. In another optional implementation, the threshold may be preset. For example, the threshold is set to 1 Gbps.

FIG. 15 is an example schematic diagram of data transmission according to an embodiment of this application. As shown in FIG. 15, if a bandwidth (the bandwidth may also be referred to as a rate) of a first code block stream 6201 is 5 Gbps, a bandwidth of a first code block stream 6202 is 5 Gbps, and a bandwidth of a first code block stream 6203 is 10 Gbps, common divisors of the bandwidths 5, 5, and 10 of the three first code block streams are 1 and 5, and a maximum common divisor is 5. If the maximum common divisor is selected as a threshold, a quantity of code blocks consecutively extracted from the first code block stream 6201 is 1, a quantity of code blocks consecutively extracted from the first code block stream 6202 is 1, and a quantity of code blocks consecutively extracted from the first code block stream 6203 is 2. As shown in FIG. 15, in such an order as the first code block stream 6201, the first code block stream 6202, and the first code block stream 6203, one code block 6204 is consecutively extracted from the first code block stream 6201 and placed into a second code block stream 6301, then one code block 6205 is consecutively extracted from the first code block stream 6202 and placed into the second code block stream 6204, and then two code blocks 6206 are consecutively extracted from the first code block stream 6203 and placed into the second code block stream 6204. Then, cyclically, one code block 6204 is consecutively extracted from the first code block stream 6201 again and placed into the second code block stream 6204, one code block 6205 is consecutively extracted from the first code block stream 6202 and placed into the second code block stream 6204, and so on. Details are not described.

Figure 11:
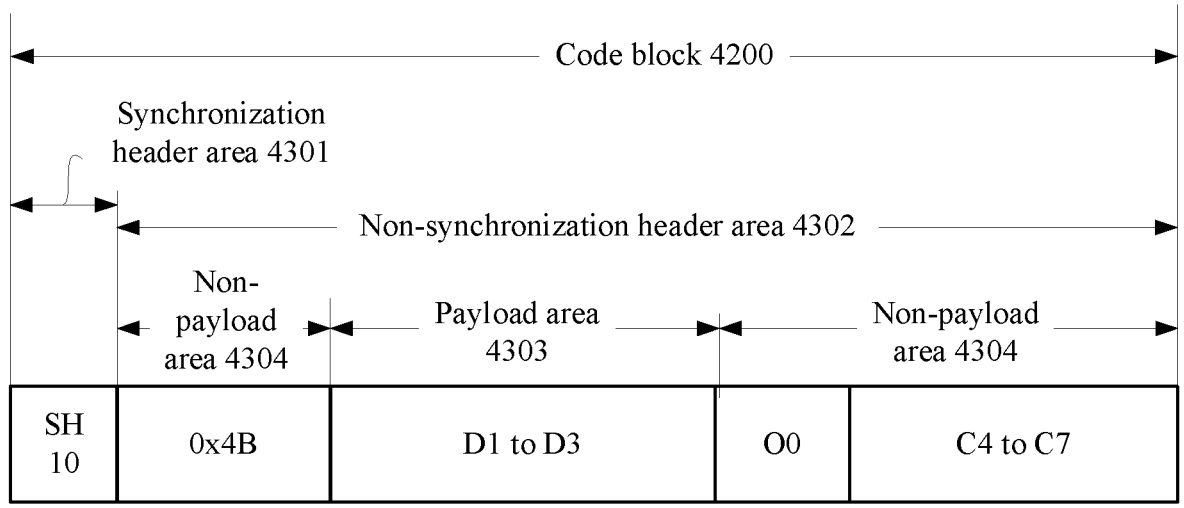
FIG. 11 is a schematic structural diagram of a code block according to an embodiment of this application.

A code block in each first code block stream shown in FIG. 15 includes a non-synchronization header area and a synchronization header area, and a quantity of bits carried in the non-synchronization header area is (N1−M1). The code block included in the first code block stream may be the code block of the control type shown in FIG. 11, FIG. 13, and FIG. 14, or may be the code block of the data type shown in FIG. 12.

As shown in FIG. 15, a sequence including code blocks extracted from all the first code block streams may be referred to as a to-be-processed code block sequence 6207. The second code block stream 6301 includes at least one data unit 6302. FIG. 15 shows a structure form of only one data unit. As shown in FIG. 15, a data unit 6302 in the second code block stream 6301 may include a head code block 6303, at least one first-type data code block 6304, and a tail code block 6305. Optionally, at least one data code block may be further included between the head code block 6303 and the tail code block 6305. Optionally, a data code block other than the first-type data code block included in the data unit may be referred to as a second-type data code block. Optionally, some code blocks may be included between data units, for example, code blocks of a control type or data code block are disposed between adjacent data units, and the code block included between data units may be referred to as a third-type code block.

Further, in this embodiment of this application, information carried in a non-synchronization header area of the first code block stream is carried in a non-synchronization header area of the first-type data code block in the second code block stream, and information carried in a synchronization header area of the first code block stream may be correspondingly placed into a payload area of any one or more of the head code block, the tail code block, the second-type data code block, and the third-type code block in the second code block stream. In an optional implementation, for a code block in the Q first code block streams that is carried in the second code block stream, the second code block stream further includes type indication information corresponding to the code block, where the type indication information is used to indicate information that is used to indicate a code block type of the code block and that is carried in a synchronization header area of the code block.

A code block in the first code block stream and type indication information corresponding to the code block may be indicated by using some indication information, so that the second communications device on the demultiplexing side can correctly determine type indication information corresponding to a non-synchronization header area of a code block that is carried in the second code block stream and that is extracted from the first code block stream. In another optional implementation, an order of the code blocks that are included in the to-be-processed code block sequence and extracted from the Q first code block streams matches an order of type indication information carried in the second code block stream. In this way, the second communications device on the demultiplexing side can correctly determine, through sorting, type indication information corresponding to a non-synchronization header area of a code block that is carried in the second code block stream and extracted from the first code block stream.

As shown in FIG. 15, a non-synchronization header area of a code block in the to-be-processed code block sequence 6207 may be correspondingly placed into a non-synchronization header area of a first-type data code block 6304 in a data unit in the second code block stream 6301. Because a coding form of the first code block stream is consistent with that of the second code block stream, a quantity of bits carried in a non-synchronization header area of a code block in the first code block stream and a quantity of bits carried in a non-synchronization header area of a code block in the second code block stream are the same, and each are M1 bits. As shown in FIG. 15, information carried in a synchronization header area of a first-type data code block 6304 included in a data unit 6302 in the second code block stream

6301 is "01". Information carried in an original synchronization header area to which a non-synchronization header area of the first-type data code block 6304 corresponds in the first code block stream may be "01" or "10". If information carried in a synchronization header area of a code block is 10, it indicates that a type of the code block is a control type, and if information carried in a synchronization header area of a code block is 01, it indicates that a type of the code block is a data type.

Figure 16:
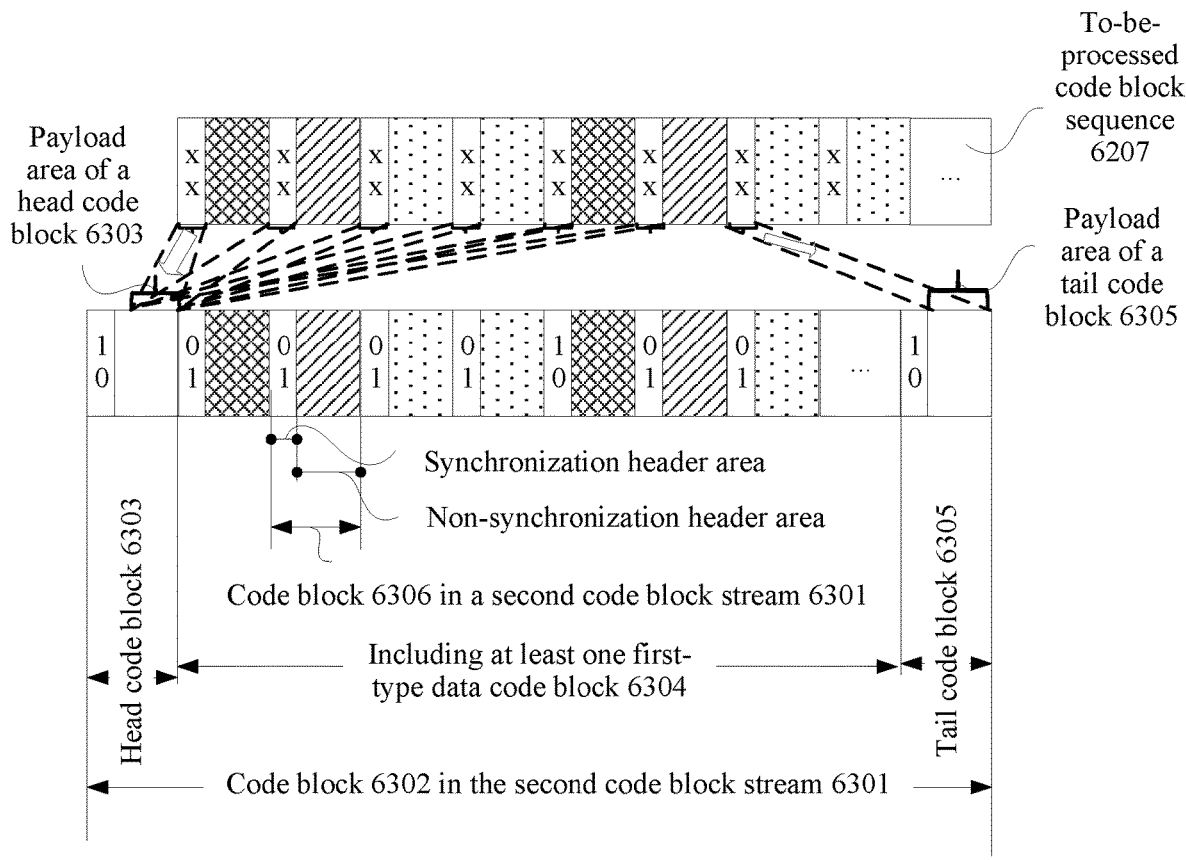
FIG. 16 is a schematic diagram of a location, in a second code block stream, of information in a synchronization header area of a first code block stream in FIG. 15 according to an embodiment of this application.

FIG. 16 is an example schematic diagram of a location, in a second code block stream, of information in a synchronization header area of a first code block stream in FIG. 15. As shown in FIG. 16, type indication information corresponding to each of all code blocks that are carried in one data unit and extracted from Q first code block streams may be placed into any one or more of a head code block 6303, a tail code block 6305, a second-type data code block, and a third-type code block. For example, the type indication information may be one bit. When a synchronization header area of a code block in the first code block stream is "10", type indication information corresponding to the code block may be "1". When a synchronization header area of a code block in the first code block stream is "01", type indication information corresponding to the code block may be "0". A location of the type indication information of the code block in the first code block stream is known to both a first communications device on a multiplexing side and a second communications device on a demultiplexing side. Such information may be configured on the first communications device on the multiplexing side and the second communications device on the demultiplexing side in advance, or may be delivered by a centralized control unit or a management unit to the first communications device on the multiplexing side and the second communications device on the demultiplexing side, or notified by the first communications device on the multiplexing side to the second communications device on the demultiplexing side or notified by the second communications device on the demultiplexing side to the first communications device on the multiplexing side.

As shown in FIG. 15 and FIG. 16, an order of all code blocks that are carried in one data unit and extracted from the Q first code block streams is consistent with an order of all type indication information corresponding to all the code blocks that are extracted from the Q first code block streams. For example, type indication information corresponding to the first code block that is carried in the data unit and extracted from the Q first code block streams is the first one in a type indication information sequence corresponding to the data unit, type indication information corresponding to the second code block that is carried in the data unit and extracted from the Q first code block streams is the second one in the type indication information sequence corresponding to the data unit, and so on. Based on an order, in the second code block stream, of all code blocks that are carried in the data unit and extracted from the Q first code block streams, the type indication information sequence corresponding to the data unit includes all type indication information corresponding to all the code blocks.

In this embodiment of this application, if the head code block is an S code block, and the tail code block is a T7 code block, a payload area in the S code block and a payload area in the T7 code block may be multiplexed. The S code block may have a payload area of 44 bits, and the T7 code block may have a payload area of 56 bits. The S code block may be immediately followed by two second-type data code blocks, and a payload area of the two second-type data code blocks is 128 bits in total. In this way, there may be a total of 228 bits (a sum of 44 bits, 56 bits, and 128 bits). If type indication information of one code block in the first code block stream occupies one bit, the 228 bits may indicate type indication information of one code block in 228 first code block streams, and therefore, one data unit may include 228 first-type data code blocks, to carry non-synchronization header areas of 228 code blocks extracted from the first code block streams. Optionally, a length of a first-type data code block in a data unit may be increased, and correspondingly, a quantity of second-type data code blocks may be increased, to carry type indication information of more code blocks in the first code block streams. Optionally, locations of the first-type data code block and other code blocks in the data unit may be flexibly configured, and may be agreed on by the first communications device on the multiplexing side and the second communications device on the demultiplexing side, or may be delivered by the centralized control unit or the management unit.

Optionally, a sum of service rates of the Q first code block streams may be less than a service rate of the second code block stream. In this way, some overheads may be increased when the first code block streams are multiplexed to the second code block stream. For example, four first code block streams whose service rate sum is 4 Gbps may be multiplexed to a second code block stream whose rate is 5 Gbps. When a service rate of each of the four first code block streams is 1 Gbps, a quantity of consecutive code blocks that may be extracted from each first code block stream is 1. This solution may also be referred to as single code block interleaving.

The foregoing example may be alternatively described as follows: A code block is extracted from the Q first code block streams; and if information carried in a synchronization header area of the code block is indication information used to indicate a code block of the control type, the information carried in the synchronization header area of the code block is updated to indication information used to indicate a code block of the data type, and the code block whose synchronization header area is updated is placed in a location of a first-type data block in the second code block stream; or if information carried in a synchronization header area of the code block is indication information used to indicate a code block of the data type, the information carried in the synchronization header area of the code block is not updated, and the code block is directly placed in a location of a first-type data code block in the second code block stream. For type indication information carried on the second code block stream, refer to the foregoing content.

Figure 17:
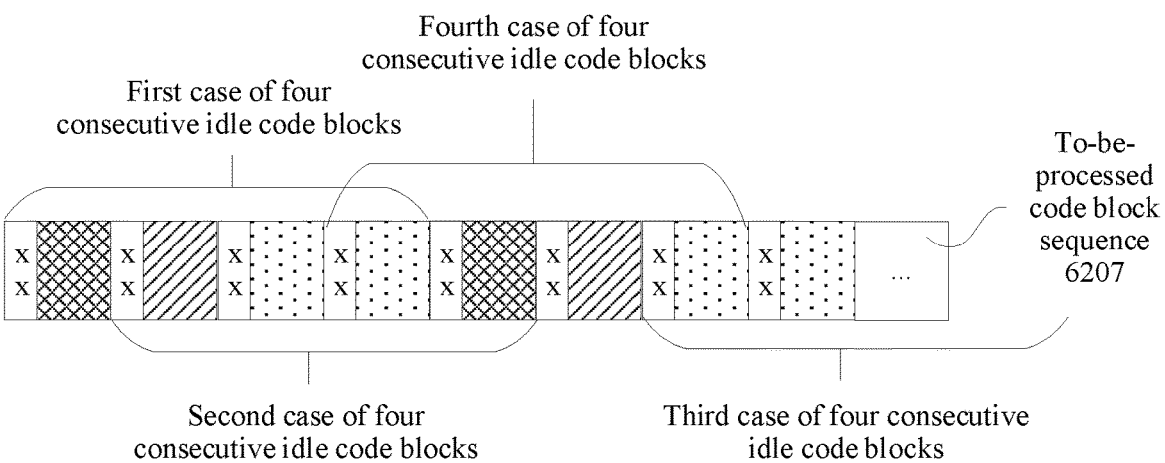
FIG. 17 is a schematic diagram of L consecutive idle code blocks in a to-be-processed code block sequence 6207 in FIG. 15 and FIG. 16 according to an embodiment of this application.

To further improve a data transmission rate, in this embodiment of this application, optionally, after the extracting the code blocks from the Q first code block streams to obtain a to-be-processed code block sequence, the method further includes: if L consecutive code blocks in the to-be-processed code block sequence are idle code blocks, deleting the L code blocks, where L is a total quantity of code blocks obtained after a code block is extracted from each of the Q first code block streams, and L is an integer not less than Q. FIG. 17 is an example schematic diagram of L consecutive idle code blocks in the to-be-processed code block sequence 6207 in FIG. 15 and FIG. 16 according to an embodiment of this application. As shown in FIG. 17, the to-be-processed code block sequence 6207 includes code blocks extracted from the first code block stream 6201, the first code block stream 6202, and the first code block stream 6203 in FIG. 15. As shown in FIG. 15 and FIG. 16, in the foregoing example, a quantity of code blocks consecutively extracted from the first code block stream 6201 is 1, a quantity of code blocks consecutively extracted from the first code block stream 6202 is 1, and a quantity of code blocks consecutively extracted from the first code block stream 6203 is 2. Therefore, a total quantity of code blocks obtained after a code block is extracted from each of the Q first code block streams is 4 (1+1+2=4). Therefore, if there are four consecutive idle code blocks in the to-be-processed code block sequence, the four consecutive idle code blocks may be deleted. As shown in FIG. 17, the first code block in the four consecutive idle code blocks may be from any first code block stream. For example, in a first case of the four consecutive idle code blocks shown in FIG. 17, the first code block is a code block in the first code block stream 6201; in a second case of the four consecutive idle code blocks shown in FIG. 17, the first code block is a code block in the first code block stream 6202; in a third case of the four consecutive idle code blocks shown in FIG. 17, the first code block is the first code block in two code blocks consecutively extracted from the first code block stream 6203; and in a fourth case of the four consecutive idle code blocks shown in FIG. 17, the first code block is the second code block in the two code blocks consecutively extracted from the first code block stream 6203. In other words, regardless of a first code block stream that the first code block in the four consecutive idle code blocks is from, the four consecutive idle code blocks may be deleted.

Further, optionally, the L consecutive idle code blocks may be deleted from the to-be-processed code block sequence; or L consecutive idle code blocks that are carried in the second code block stream and that are from the to-be-processed code block sequence may be deleted after the to-be-processed code block sequence is placed into the second code block stream.

An embodiment of this application further provides an optional implementation: For a data unit in at least one data unit included in the second code block stream, a preset code block in the data unit carries multiplexing indication information, where the multiplexing indication information is used to indicate that the data unit carries a multiplexed code block. Optionally, the multiplexing indication information may be used to indicate a quantity of code blocks consecutively extracted from each of the Q first code block streams. The preset code block includes any one of a head code block, a tail code block, a second-type data code block, and a third-type code block between two adjacent data units. In an optional implementation, if the head code block is an S code block, the multiplexing indication information may include information carried in the first byte D1 of the S code block, for example, 0x56 is used to indicate that a data unit corresponding to the S code block carries a multiplexed code block.

Further, optionally, the multiplexing indication information may indicate a quantity of code blocks consecutively extracted from each of the Q first code block streams. For example, single code block interleaving is used, and the single code block interleaving means that a quantity of code blocks consecutively extracted from each first code block stream each time is 1. For example, in other words, if the head code block is an S code block, the multiplexing indication information may be represented by information carried on bits 0 to 3 of the second byte D2 of the S code block. For example, a value 0b0011 indicates that the second code block stream uses single code block interleaving of 64B/66B. In other words, if the second communications device on the demultiplexing side receives the S code block and learns, through parsing, that the first byte D1 of the S code block carries 0x56, the second communications device learns that a data unit to which the S code block belongs carries a multiplexed code block, and that the data unit to which the S code block belongs needs to be demultiplexed. If 0b0011 is parsed on bits 0 to 3 of the second byte D2 of the S code block, it is determined that the data unit to which the S code block belongs uses single code block interleaving of 64B/66B, so that demultiplexing may be performed based on the multiplexing indication information.

In an optional implementation, optionally, the multiplexing indication information may be carried in the second code block stream, and the multiplexing indication information is used to indicate that the data unit carries the multiplexed code block, in other words, after receiving a code block in the data unit, the demultiplexing side needs to perform a demultiplexing operation. The multiplexing indication information may be carried inside a data unit in the second code block stream, for example, carried in any one or more of a head code block, a second-type data code block, and a tail code block. In this case, the multiplexing indication information may only indicate that a data unit including the multiplexing indication information carries the multiplexed code block. In another optional implementation, the multiplexing indication information may be carried in a code block between adjacent data units. For example, an O code block may be configured between adjacent data units, and the multiplexing indication information may be carried in a payload area of the O code block. In this case, after the multiplexing indication information is received, it may be determined that all code blocks carried in the data unit and received after the multiplexing indication information are multiplexed code blocks, and need to be demultiplexed until non-multiplexing indication information is received. The non-multiplexing indication information may indicate that a code block carried in a data unit after the non-multiplexing indication information does not need to be demultiplexed.

In step 4101, in an optional implementation, if a coding form of each data stream in obtained Q third data streams from the low-order pipeline is not M1/N1 bit coding, each of the Q third data streams may be coded and converted, and each third data stream is converted into a first code block stream whose coding form is M1/N1 bit coding.

In specific implementations, the third data stream may be, for example, a synchronous digital hierarchy (SDH) service signal, and service mapping processing may be performed on the third data stream. For example, the third data stream may be encapsulated into a payload area of a data unit in the first code block stream, and then, necessary encapsulation overheads, an OAM code block, and an idle code block are added, to obtain a first code block stream corresponding to the third data stream. The idle code block is added to the third data stream, to implement adaptation of a rate of the first code block stream to a rate of a corresponding pipeline by adding or deleting the idle code block. For example, when the M1/N1 bit coding is 64B/66B coding, an SDH service can be mapped to a payload area of a 64B/66B data code block in consecutive bytes or bits, and a synchronization header '01' is added, to convert this signal stream into a form of 64B/66B coding.

Based on the foregoing described solution executed by the first communications device on the multiplexing side, an embodiment of this application further provides a data transmission method, and the data transmission method is implemented by a second communications device on a demultiplexing side. FIG. 18 is an example schematic flowchart of a data transmission method according to an embodiment of this application. As shown in FIG. 18, the method includes the following steps.

Step 7201: A second communications device on a demultiplexing side receives a second code block stream, where a non-synchronization header area of a code block in Q first code block streams is carried in a non-synchronization header area of a code block in the second code block stream, Q is an integer greater than 1, a coding type of the second code block stream is M1/N1 bit coding, a coding type of the first code block stream is M1/N1 bit coding, M1 is a positive integer, N1 is an integer not less than M1, one code block in the first code block stream includes a synchronization header area of (N1−M1) bits and a non-synchronization header area of M1 bits, and one code block in the second code block stream includes a synchronization header area of (N1−M1) bits and a non-synchronization header area of M1 bits Step 7202: The second communications device on the demultiplexing side demultiplexes the Q first code block stream. Demultiplexing may also be referred to as de-interleaving.

In specific implementations, optionally, the second communications device on the demultiplexing side may obtain, from the received second code block stream, a non-synchronization area of a code block that is in the first code block stream and that is carried in the second code block stream, for example, may obtain, from a non-synchronization area of a first-type data block that is agreed on in advance, the non-synchronization area of the code block that is in the first code block stream and that is carried in the second code block stream. Optionally, a non-synchronization header area of a code block in the Q first code block streams that is carried in a non-synchronization header area of the second code block stream is obtained. Optionally, a synchronization header area of the code block in the Q first code block streams that is carried in the non-synchronization header area of the second code block stream may be determined based on type indication information corresponding to the obtained code block in the Q first code block streams that is carried in the second code block stream, to obtain a to-be-restored code block sequence. Further, the Q first code block streams are demultiplexed based on the to-be-restored code block sequence.

In this embodiment of this application, the second communications device on the demultiplexing side may determine, in a plurality of manners, the type indication information corresponding to the code block in the Q first code block streams that is carried in the second code block stream, for example, by using indication information sent by a first communications device on a multiplexing side, or based on the sorting solution mentioned in FIG. 15 and FIG. 16. Optionally, an order of code blocks that are included in the to-be-restored code block sequence and extracted from the Q first code block streams matches an order of type indication information carried in the second code block stream. With reference to FIG. 15 and FIG. 16, if the to-be-processed code block sequence 6207 matches an order of type indication information, in the second code block stream, of the code blocks included in the to-be-processed code block sequence 6207, the second communications device on the demultiplexing side may inversely determine, based on this feature, the type indication information corresponding to the code block in the Q first code block streams that is carried in the second code block stream. For example, the second communications device may first sequentially extract non-synchronization header areas carried in first-type data code blocks in a data unit in the second code block stream, then sequentially extract all type indication information correspondingly carried on the data unit, and make the sequentially extracted non-synchronization header areas and all the sequentially extracted type indication information be in a one-to-one correspondence based on their respective orders, so that type indication information corresponding to each non-synchronization header area is determined. Then, for each of the sequentially extracted non-synchronization header areas, a synchronization header area may be determined based on type indication information corresponding to the non-synchronization header area. The non-synchronization header area and the synchronization header area corresponding to the non-synchronization header area form a code block in the to-be-restored code block sequence together.

Further, optionally, an order of code blocks that are included in the to-be-restored code block sequence and extracted from the Q first code block streams matches an order of the Q first code block streams. In an optional implementation, an order of code blocks in the to-be-restored code block sequence is consistent with an order of non-synchronization header areas corresponding to the code blocks extracted from the second code block stream, and then an identifier of a first code block stream corresponding to each code block in the to-be-restored code block sequence is determined based on an order of the first code block streams followed in a process of multiplexing the first code block streams and a quantity of code blocks consecutively extracted from each first code block stream. In another optional implementation, the identifier of the first code block stream corresponding to each code block in the to-be-restored code block sequence may be determined by using identifier indication information sent by the first communications device on the multiplexing side.

Optionally, the order of the first code block streams and the quantity of code blocks consecutively extracted from each first code block stream during multiplexing may be agreed on by the first communications device on the multiplexing side and the second communications device on the demultiplexing side, or delivered by a centralized control unit or a management unit, or preconfigured on the first communications device on the multiplexing side and the second communications device on the demultiplexing side, or respectively determined by the first communications device on the multiplexing side and the second communications device on the demultiplexing side according to a specific criterion. For example, the first communications device on the multiplexing side determines, based on the foregoing mentioned bandwidth and threshold of the first code block stream, the quantity of code blocks consecutively extracted from the first code block stream, and the second communications device on the demultiplexing side also determines, based on the foregoing mentioned bandwidth and threshold of the first code block stream, the quantity of code blocks consecutively extracted from the first code block stream. In other words, for a first code block stream in the Q first code block streams, a quantity of consecutive code blocks corresponding to the first code block stream that is included in the to-be-restored code block sequence is determined based on a bandwidth and a threshold of the first code block stream. Therefore, the identifier of the first code block stream corresponding to each code block in the to-be-restored code block sequence may be determined according to this rule and a preset order of the first code block streams.

Further, optionally, if the first code block stream is obtained by coding and converting a third code block stream, the second communications device on the demultiplexing side may further code and convert the restored first code block stream, to restore a code block stream whose coding form is the same as that of the third code block stream.

It may be learned from the foregoing content that, in this embodiment of this application, hierarchical networking of an end-to-end FlexE client channel may be completely implemented, and multiplexing and demultiplexing may be performed level by level based on a network hierarchy. Therefore, a function of forming a large-scale network can be better completed, and network management, operation, and maintenance difficulties are reduced. In one aspect, the first code block streams can be demultiplexed at a code block granularity, and based on the solution provided in this embodiment of this application, the demultiplexing side can accurately restore each first code block stream, so that transmission efficiency is improved, and multiplexing and demultiplexing efficiency is relatively high. In another aspect, a structure of a data unit in the second code block stream may be flexibly configured, and adaptability is relatively strong. In a third aspect, because there is a multiple relationship between many service rates, when the first code block streams are multiplexed based on a common divisor or a maximum common divisor, multiplexing efficiency can be improved to a relatively large extent. For example, when two first code block streams of 10 GE are loaded in a second code block stream of 25 GE, several first code block streams of 1 GE may be further loaded. There may be at least two first code block streams in the Q first code block streams, and service rates or bandwidths of the at least two first code block streams are different. In a fourth aspect, a preset quantity of idle code blocks consecutively extracted from the Q first code block streams may be discarded, to further improve transmission efficiency, or to make it possible to improve multiplexing efficiency to 100%. In addition, because the idle code blocks may be deleted, when the second code block stream carries overheads (for example, a head code block, a tail code block, and a second-type data code block), the idle code block may be deleted to offset the overheads. For example, a second code block stream of 5 GE may be applied to multiplex five first code block streams of 1 Gbps. In a fifth aspect, multi-hierarchical multiplexing in a network may further improve the capability of forming a large-scale network. For an effect, refer to FIG. 6.

Based on the foregoing content, this application provides a communications device 8101, configured to execute any solution on a multiplexing side in the foregoing methods. FIG. 19 is an example schematic structural diagram of a communications device in this application. As shown in FIG. 19, the communications device 8101 includes a processor 8103, a transceiver 8102, a memory 8105, and a communications interface 8104. The processor 8103, the transceiver 8102, the memory 8105, and the communications interface 8104 are connected using a bus 8106. The communications device 8101 in this example may be the first communications device in the foregoing content, and may execute the solution corresponding to FIG. 7. The communications device 8101 may be the communications device 3105 in FIG. 4 and FIG. 5, or may be the communications device 3107.

The bus 8106 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The memory 8105 may include a volatile memory, for example, a random access memory (RAM); or the memory may include a non-volatile memory, for example, a flash memory, a hard disk drive (HDD), or a solid-state drive (SSD); or the memory 8105 may include a combination of the foregoing types of memories.

The communications interface 8104 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 8103 may be a central processing unit (central processing unit, CPU), a network processor (NP), or a combination of a CPU and an NP. The processor 8103 may further include a hardware chip. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

Optionally, the memory 8105 may be further configured to store a program instruction. The processor 8103 invokes the program instruction stored in the memory 8105, to perform one or more steps or optional implementations in the embodiments shown in the foregoing solutions, so that the communications device 8101 implements functions of the communications device in the foregoing methods.

The processor 8103 is configured to: execute the instruction stored in the memory, and control the transceiver 8102 to receive and send a signal. When the processor 8103 executes the instruction stored in the memory, the communications device 8101 is configured to:

The processor 8103 is configured to: obtain Q first code block streams, and place non-synchronization header areas of code blocks in the Q first code block streams into a to-be-sent second code block stream. The transceiver 8102 is configured to send the second code block stream; where Q is an integer greater than 1, a coding type of the first code block stream is M1/N1 bit coding, M1 is a positive integer, N1 is an integer not less than M1, one code block in the first code block stream includes a synchronization header area of (N1−M1) bits and a non-synchronization header area of M1 bits, a coding type of the second code block stream is M1/N1 bit coding, one code block in the second code block stream includes a synchronization header area of (N1−M1) bits and a non-synchronization header area of M1 bits, and a non-synchronization header area of a code block in the Q first code block streams is carried in a non-synchronization header area of a code block in the second code block stream. In other words, in the solution provided in this embodiment of this application, a code block stream is multiplexed and demultiplexed at a code block granularity, and in this way, the second code block stream arrives at a communications device on a demultiplexing side through at least one intermediate node, and the intermediate node does not demultiplex the second code block stream, so that a quantity of cross connections between intermediate nodes in a network is reduced, thereby reducing pressure on network management, operation, and maintenance.

In an optional implementation, the processor 8103 is configured to: extract the code blocks from the Q first code block streams based on an order of the Q first code block streams, to obtain a to-be-processed code block sequence, where for a first code block stream in the Q first code block streams, a quantity of code blocks consecutively extracted from the first code block stream is determined based on a bandwidth and a threshold of the first code block stream; and place non-synchronization header areas of the code blocks in the to-be-processed code block sequence into the to-be-sent second code block stream.

In an optional implementation, the processor 8103 is further configured to: if L consecutive code blocks in the to-be-processed code block sequence are IDLE code blocks, delete the L code blocks; where L is a total quantity of code blocks obtained after a code block is extracted from each of the Q first code block streams, and L is an integer not less than Q.

The second code block stream in this embodiment of this application may have a plurality of data structures. For a specific example, refer to the foregoing embodiments. Details are not described herein again.

In this embodiment of this application, for other information carried in the second code block stream, such as identifier indication information, type indication information, and multiplexing indication information, refer to content in the foregoing embodiments. Details are not described herein again.

In this embodiment of this application, for a manner of placing, into the second code block stream, the code blocks extracted from the first code block streams, and a solution of a quantity of code blocks consecutively extracted from one first code block stream, refer to the foregoing embodiments. Details are not described herein again.

Figure 20:
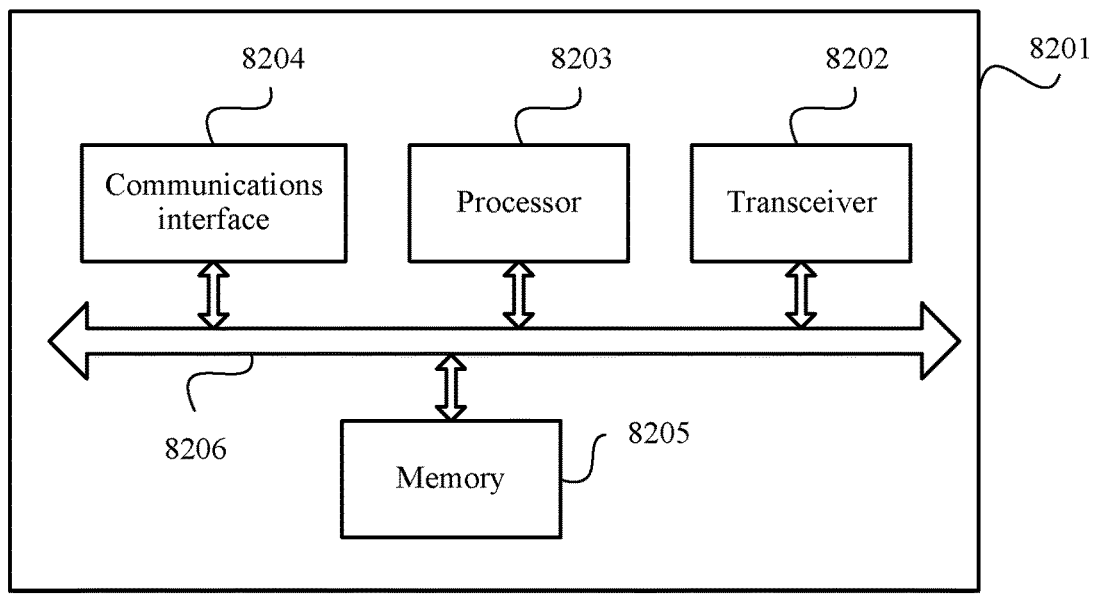
FIG. 20 is a schematic structural diagram of another communications device according to an embodiment of this application.

Based on a same concept, this application provides a communications device 8201, configured to execute any solution on a demultiplexing side in the foregoing methods. FIG. 20 is an example schematic structural diagram of a communications device in this application. As shown in FIG. 20, the communications device 8201 includes a processor 8203, a transceiver 8202, a memory 8205, and a communications interface 8204. The processor 8203, the transceiver 8202, the memory 8205, and the communications interface 8204 are connected to each other by using a bus 8206. The communications device 8201 in this example may be the second communications device in the foregoing content, and may execute the solution corresponding to FIG. 18. The communications device 8201 may be the communications device 3109 in FIG. 4, or may be the communications device 3109 in FIG. 5, or may be the communications device 3115 in FIG. 5.

The bus 8206 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

The memory 8205 may include a volatile memory, for example, a random access memory (RAM); or the memory may include a non-volatile memory, for example, a flash memory, a hard disk drive (HDD), or a solid-state drive (SSD); or the memory 8205 may include a combination of the foregoing types of memories.

The communications interface 8204 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 8203 may be a central processing unit (CPU), a network processor (NP), or a combination of a CPU and an NP. The processor 8203 may further include a hardware chip. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

Optionally, the memory 8205 may be further configured to store a program instruction. The processor 8203 invokes the program instruction stored in the memory 8205, to perform one or more steps or optional implementations in the embodiments shown in the foregoing solutions, so that the communications device 8201 implements functions of the communications device in the foregoing methods.

The processor 8203 is configured to: execute the instruction stored in the memory, and control the transceiver 8202 to receive and send a signal. When the processor 8203 executes the instruction stored in the memory, the communications device 8201 is configured to:

The transceiver 8202 is configured to receive a second code block stream, where a non-synchronization header area of a code block in Q first code block streams is carried in a non-synchronization header area of a code block in the second code block stream, Q is an integer greater than 1, a coding type of the second code block stream is M1/N1 bit coding, a coding type of the first code block stream is M1/N1 bit coding, M1 is a positive integer, N1 is an integer not less than M1, one code block in the first code block stream includes a synchronization header area of (N1−M1) bits and a non-synchronization header area of M1 bits, and one code block in the second code block stream includes a synchronization header area of (N1−M1) bits and a non-synchronization header area of M1 bits. The processor 8203 is configured to demultiplex the Q first code block streams. In this way, a code block stream is multiplexed and demultiplexed at a code block granularity, the second code block stream arrives at a communications device on a demultiplexing side through at least one intermediate node, and the intermediate node does not demultiplex the second code block stream, so that a quantity of cross connections between intermediate nodes in a network can be reduced, thereby reducing pressure on network management, operation, and maintenance.

In an optional implementation, the processor 8203 is configured to: obtain a non-synchronization header area of a code block in the Q first code block streams that is carried in a non-synchronization header area of the second code block stream, and determine, based on type indication information corresponding to the code block in the Q first code block streams that is carried in the second code block stream, a synchronization header area of the code block in the Q first code block streams that is carried in the non-synchronization header area of the second code block stream, to obtain a to-be-restored code block sequence; and demultiplex the Q first code block streams based on the to-be-restored code block sequence, where for a code block that is in the Q first code block streams and whose non-synchronization header area is carried in the second code block stream, type indication information corresponding to the code block is used to indicate information that is carried in a synchronization header area of the code block and that is used to indicate a code block type of the code block.

The second code block stream in this embodiment of this application may have a plurality of data structures. For a specific example, refer to the foregoing embodiments. Details are not described herein again.

In this embodiment of this application, for other information carried in the second code block stream, such as identifier indication information, type indication information, and multiplexing indication information, refer to content in the foregoing embodiments. Details are not described herein again.

In this embodiment of this application, for a manner of placing, into the second code block stream, the code blocks extracted from the first code block streams, and a solution of a quantity of code blocks consecutively extracted from one first code block stream, refer to the foregoing embodiments. Details are not described herein again.

Figure 21:
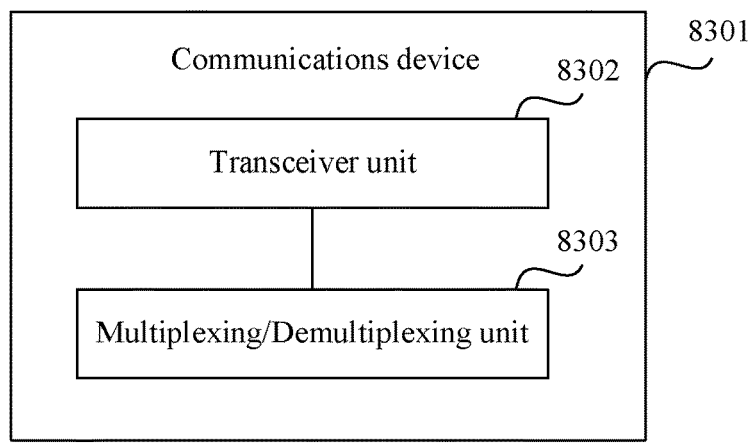
FIG. 21 is a schematic structural diagram of another communications device according to an embodiment of this application.

Based on a same concept, an embodiment of this application provides a communications device, configured to execute any solution on a multiplexing side in the foregoing method procedure. FIG. 21 is an example schematic structural diagram of a communications device according to an embodiment of this application. As shown in FIG. 21, a communications device 8301 includes a transceiver unit 8302 and a multiplexing/demultiplexing unit 8303. The communications device 8301 in this example may be the first communications device in the foregoing content, and may execute the solution corresponding to FIG. 7. The communications device 8301 may be the communications device 3105 in FIG. 4 and FIG. 5, or may be the communications device 3107.

The multiplexing/demultiplexing unit 8303 is configured to: obtain Q first code block streams, and place non-synchronization header areas of code blocks in the Q first code block streams into a to-be-sent second code block stream. The transceiver unit 8302 is configured to send the second code block stream; where Q is an integer greater than 1, a coding type of the first code block stream is M1/N1 bit coding, M1 is a positive integer, N1 is an integer not less than M1, one code block in the first code block stream includes a synchronization header area of (N1−M1) bits and a non-synchronization header area of M1 bits, a coding type of the second code block stream is M1/N1 bit coding, one code block in the second code block stream includes a synchronization header area of (N1−M1) bits and a non-synchronization header area of M1 bits, and a non-synchronization header area of a code block in the Q first code block streams is carried in a non-synchronization header area of a code block in the second code block stream.

In this embodiment of this application, the transceiver unit 8302 may be implemented by the transceiver 8102 in FIG. 19, and the multiplexing/demultiplexing unit 8303 may be implemented by the processor 8103 in FIG. 19. In other words, the transceiver unit 8302 in this embodiment of this application may execute the solution executed by the transceiver 8102 in FIG. 19, and the multiplexing/demultiplexing unit 8303 in this embodiment of this application may execute the solution executed by the processor 8103 in FIG. 19. For remaining content, refer to the foregoing content. Details are not described herein again.

It should be understood that the division of the first communications devices and the second communications devices is merely a logical function division. In actual implementation, all or some of the first communications devices and the second communications devices may be integrated into one physical entity, or may be physically separated. In this embodiment of this application, the transceiver unit 8302 may be implemented by the transceiver 8102 in FIG. 19, and the multiplexing/demultiplexing unit 8303 may be implemented by the processor 8103 in FIG. 19. As shown in FIG. 19, the memory 8105 included in the communications device 8101 may be configured to store code used when the processor 8103 included in the communications device 8101 executes the solution, and the code may be a program/code pre-installed when the communications device 8101 is delivered from a factory.

Figure 22:
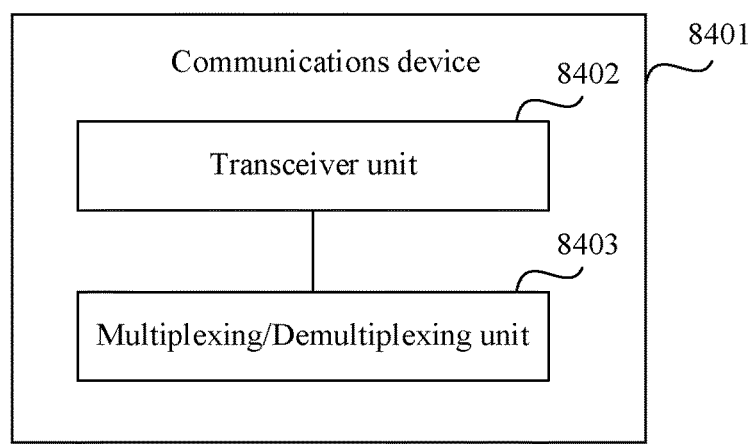
FIG. 22 is a schematic structural diagram of another communications device according to an embodiment of this application.

Based on a same concept, an embodiment of this application provides a communications device, configured to execute any solution on a demultiplexing side in the foregoing method procedure. FIG. 22 is an example schematic structural diagram of a communications device according to an embodiment of this application. As shown in FIG. 22, a communications device 8401 includes a transceiver unit 8402 and a multiplexing/demultiplexing unit 8403. The communications device 8401 in this example may be the second communications device in the foregoing content, and may execute the solution corresponding to FIG. 18. The communications device 8401 may be the communications device 3109 in FIG. 4, or may be the communications device 3109 in FIG. 5, or may be the communications device 3115 in FIG. 5.

The transceiver unit 8402 is configured to receive a second code block stream, where a non-synchronization header area of a code block in Q first code block streams is carried in a non-synchronization header area of a code block in the second code block stream, Q is an integer greater than 1, a coding type of the second code block stream is M1/N1 bit coding, a coding type of the first code block stream is M1/N1 bit coding, M1 is a positive integer, N1 is an integer not less than M1, one code block in the first code block stream includes a synchronization header area of (N1−M1) bits and a non-synchronization header area of M1 bits, and one code block in the second code block stream includes a synchronization header area of (N1−M1) bits and a non-synchronization header area of M1 bits. The multiplexing/demultiplexing unit 8403 is configured to demultiplex the Q first code block streams.

In this embodiment of this application, the transceiver unit 8402 may be implemented by the transceiver 8202 in FIG. 20, and the multiplexing/demultiplexing unit 8403 may be implemented by the processor 8203 in FIG. 20. In other words, the transceiver unit 8402 in this embodiment of this application may execute the solution executed by the transceiver 8202 in FIG. 20, and the multiplexing/demultiplexing unit 8403 in this embodiment of this application may execute the solution executed by the processor 8203 in FIG. 20. For remaining content, refer to the foregoing content. Details are not described herein again.

It should be understood that the division of the first communications devices and the second communications devices is merely a logical function division. In actual implementation, all or some of the first communications devices and the second communications devices may be integrated into one physical entity, or may be physically separated. In this embodiment of this application, the transceiver unit 8402 may be implemented by the transceiver 8202 in FIG. 20, and the multiplexing/demultiplexing unit 8403 may be implemented by the processor 8203 in FIG. 20. As shown in FIG. 20, the memory 8201 included in the communications device 8205 may be configured to store code used when the processor 8201 included in the communications device 8203 executes the solution, and the code may be a program/code pre-installed when the communications device 8201 is delivered from a factory.

All or some of the foregoing embodiments may be implemented by using software, hardware, firmware, or any combination thereof. When being implemented by using a software program, all or some of the embodiments may be implemented in the form of a computer program product.

The computer program product includes one or more instructions. When the computer program instructions are loaded and executed on the computer, all or some of the procedures or functions according to the embodiments of this application are generated. The computer may be a general-purpose computer, a dedicated computer, a computer network, or another programmable apparatus. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, a magnetic tape, or a magneto-optical disk (MO)), an optical medium (for example, a CD, a DVD, a BD, or an HVD), a semiconductor medium (for example, a ROM, an EPROM, an EEPROM, a non-volatile memory (NAND FLASH), or a solid-state drive (Solid State Disk, SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

A person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method, comprising:
    obtaining, using a processor, Q first code block streams, wherein Q is an integer greater than 1, a coding type of the first code block stream is M1/N1 bit coding, M1 is a positive integer, N1 is an integer not less than M1, and wherein one code block in the first code block stream comprises a synchronization header area of (N1−M1) bits and a non-synchronization header area of M1 bits; and
    placing, using the processor, non-synchronization header areas of code blocks in the Q first code block streams into a to-be-sent second code block stream, wherein a coding type of the second code block stream is M1/N1 bit coding, one code block in the second code block stream comprises a synchronization header area of (N1−M1) bits and a non-synchronization header area of M1 bits, and a non-synchronization header area of a code block in the Q first code block streams is carried in a non-synchronization header area of a code block in the second code block stream; and
    sending, using a transceiver, the second code block stream.

2. The method according to claim 1, wherein the second code block stream comprises at least one data unit;
    wherein one data unit in the at least one data unit comprises a head code block and at least one data code block; or one data unit in the at least one data unit comprises a head code block, at least one data code block, and a tail code block; or one data unit in the at least one data unit comprises at least one data code block and a tail code block;
    the at least one data code block comprises at least one first-type data code block, or the at least one data code block comprises at least one first-type data code block and at least one second-type data code block;
    a non-synchronization header area of a code block in the Q first code block streams is carried in a non-synchronization header area of a first-type data code block in the second code block stream; and/or type indication information corresponding to a code block in the Q first code block streams is carried in a non-synchronization header area of any one of the head code block, the second-type data code block, and the tail code block in the second code block stream; and
    type indication information corresponding to a code block is used to indicate information carried in a synchronization header area of the code block.

3. The method according to claim 1, wherein for a code block in the Q first code block streams that is carried in the second code block stream, the second code block stream further comprises identifier indication information corresponding to the code block and wherein the identifier indication information is used to indicate an identifier of a first code block stream corresponding to the code block.

4. The method according to claim 1, wherein the placing of the non-synchronization header areas of code blocks in the Q first code block streams into a to-be-sent second code block stream comprises:
   extracting the code blocks from the Q first code block streams based on an order of the Q first code block streams, to obtain a to-be-processed code block sequence, wherein for a first code block stream in the Q first code block streams, a quantity of code blocks consecutively extracted from the first code block stream is determined based on a bandwidth and a threshold of the first code block stream; and
   placing non-synchronization header areas of the code blocks in the to-be-processed code block sequence into the to-be-sent second code block stream.

5. The method according to claim 4, wherein for a code block in the Q first code block streams that is carried in the second code block stream, the second code block stream further comprises type indication information corresponding to the code block, and wherein the type indication information is used to indicate information that is carried in a synchronization header area of the code block and that is used to indicate a code block type of the code block.

6. The method according to claim 4, wherein after the extracting the code blocks from the Q first code block streams to obtain a to-be-processed code block sequence, the method further comprises:
   if L consecutive code blocks in the to-be-processed code block sequence are IDLE code blocks, deleting the L code blocks; wherein
   L is a total quantity of code blocks obtained after a code block is extracted from each of the Q first code block streams, and L is an integer not less than Q.

7. The method according to claim 4, wherein the threshold of the first code block stream is determined based on a common divisor or a maximum common divisor of Q bandwidths corresponding to the Q first code block streams.

8. The method according to claim 1, wherein the at least one data code block in the second code block stream further comprises at least one second-type data code block; and
   wherein a data unit in the at least one data unit comprised in the second code block stream, comprises a preset code block and carries multiplexing indication information: wherein the multiplexing indication information is used to indicate a quantity of multiplexed code blocks carried by the data unit and/or code blocks consecutively extracted from each of the Q first code block streams, wherein the preset code block comprises any one of a head code block, a tail code block, a second-type data code block, and a third-type code block between two adjacent data units.

9. A method, comprising:
   receiving, using a transceiver, a second code block stream, wherein a non-synchronization header area of a code block in Q first code block streams is carried in a non-synchronization header area of a code block in the second code block stream, wherein Q is an integer greater than 1, a coding type of the second code block stream is M1/N1 bit coding, a coding type of the first code block stream is M1/N1 bit coding, M1 is a positive integer, N1 is an integer not less than M1, one code block in the first code block stream comprises a synchronization header area of (N1−M1) bits and a non-synchronization header area of M1 bits, and one code block in the second code block stream comprises a synchronization header area of (N1−M1) bits and a non-synchronization header area of M1 bits; and
   demultiplexing, using a processor, the Q first code block streams.

10. The method according to claim 9, wherein the second code block stream further comprises at least one data unit; wherein:
   one data unit in the at least one data unit comprises a head code block and at least one data code block; or one data unit in the at least one data unit comprises a head code block, at least one data code block, and a tail code block; or one data unit in the at least one data unit comprises at least one data code block and a tail code block;
   the at least one data code block comprises at least one first-type data code block, or the at least one data code block comprises at least one first-type data code block and at least one second-type data code block;
   a non-synchronization header area of a code block in the Q first code block streams is carried in a non-synchronization header area of a first-type data code block in the second code block stream; and/or type indication information corresponding to a code block in the Q first code block streams is carried in a non-synchronization header area of any one of the head code block, the second-type data code block, and the tail code block in the second code block stream; and
   type indication information corresponding to a code block is used to indicate information carried in a synchronization header area of the code block.

11. The method according to claim 9, wherein the demultiplexing the Q first code block streams further comprises:
   obtaining a non-synchronization header area of a code block in the Q first code block streams that is carried in a non-synchronization header area of the second code block stream, and determining, based on type indication information corresponding to the code block in the Q first code block streams that is carried in the second code block stream, a synchronization header area of the code block in the Q first code block streams that is carried in the non-synchronization header area of the second code block stream, to obtain a to-be-restored code block sequence; and
   demultiplexing the Q first code block streams based on the to-be-restored code block sequence; wherein
   for a code block that is in the Q first code block streams and whose non-synchronization header area is carried in the second code block stream, type indication information corresponding to the code block is used to indicate information that is carried in a synchronization header area of the code block and that is used to indicate a code block type of the code block.

12. The method according to claim 11, wherein for a first code block stream in the Q first code block streams, a quantity of consecutive code blocks corresponding to the first code block stream that are comprised in the to-be-restored code block sequence is determined based on a bandwidth and a threshold of the first code block stream.

13. The method according to claim 12, wherein the threshold of the first code block stream is determined based on a common divisor or a maximum common divisor of Q bandwidths corresponding to the Q first code block streams.

14. The method according to claim 9, wherein the at least one data code block in the second code block stream further comprises at least one second-type data code block; and
   wherein a data unit in the at least one data unit comprised in the second code block stream, comprises a preset code block and carries multiplexing indication information; wherein the multiplexing indication information is used to indicate a quantity of multiplexed code blocks carried by the data unit and/or code blocks consecutively extracted from each of the Q first code block streams, wherein the preset code block comprises any one of a head code block, a tail code block, a second-type data code block, and a third-type code block between two adjacent data units.

15. A device, comprising:
a processor, configured to: obtain Q first code block streams, and place non-synchronization header areas of code blocks in the Q first code block streams into a to-be-sent second code block stream; and
a transceiver, configured to send the second code block stream; wherein
Q is an integer greater than 1, a coding type of the first code block stream is M1/N1 bit coding, M1 is a positive integer, N1 is an integer not less than M1, and one code block in the first code block stream comprises a synchronization header area of (N1−M1) bits and a non-synchronization header area of M1 bits; and
a coding type of the second code block stream is M1/N1 bit coding, one code block in the second code block stream comprises a synchronization header area of (N1−M1) bits and a non-synchronization header area of M1 bits, and a non-synchronization header area of a code block in the Q first code block streams is carried in a non-synchronization header area of a code block in the second code block stream.

16. The device according to claim 15, wherein the second code block stream further comprises at least one data unit; wherein one data unit in the at least one data unit comprises a head code block and at least one data code block; or wherein one data unit in the at least one data unit comprises a head code block, at least one data code block, and a tail code block; or wherein one data unit in the at least one data unit comprises at least one data code block and a tail code block;
the at least one data code block comprises at least one first-type data code block, or the at least one data code block comprises at least one first-type data code block and at least one second-type data code block;
a non-synchronization header area of a code block in the Q first code block streams is carried in a non-synchronization header area of a first-type data code block in the second code block stream; and/or type indication information corresponding to a code block in the Q first code block streams is carried in a non-synchronization header area of any one of the head code block, the second-type data code block, and the tail code block in the second code block stream; and
type indication information corresponding to a code block is used to indicate information carried in a synchronization header area of the code block.

17. The device according to claim 15, wherein for a code block in the Q first code block streams that is carried in the second code block stream, the second code block stream further comprises identifier indication information corresponding to the code block; and
the identifier indication information is used to indicate an identifier of a first code block stream corresponding to the code block.

18. The device according to claim 15, wherein the processor is further configured to:
to obtain a to-be-processed code block sequence;
extract the code blocks from the Q first code block streams based on an order of the Q first code block streams, wherein for a first code block stream in the Q first code block streams, a quantity of code blocks consecutively extracted from the first code block stream is determined based on a bandwidth and a threshold of the first code block stream; and
place non-synchronization header areas of the code blocks in the to-be-processed code block sequence into the to-be-sent second code block stream.

19. The device according to claim 18, wherein for a code block in the Q first code block streams that is carried in the second code block stream, the second code block stream further comprises type indication information corresponding to the code block; and
wherein the type indication information is used to indicate information that is carried in a synchronization header area of the code block and that is used to indicate a code block type of the code block.

20. The device according to claim 18, wherein the processor is further configured to:
if L consecutive code blocks in the to-be-processed code block sequence are IDLE code blocks, delete the L code blocks; wherein
L is a total quantity of code blocks obtained after a code block is extracted from each of the Q first code block streams, and L is an integer not less than Q.

* * * * *